(12) United States Patent
Hirakawa et al.

(10) Patent No.: US 8,476,818 B2
(45) Date of Patent: *Jul. 2, 2013

(54) ELECTRON EMITTING ELEMENT INCLUDING A FINE PARTICLE LAYER CONTAINING INSULATING PARTICLES, AND DEVICES AND METHODS RELATED THERETO

(75) Inventors: Hiroyuki Hirakawa, Osaka (JP); Ayae Nagaoka, Osaka (JP); Yasuo Imura, Osaka (JP); Tadashi Iwamatsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 570 days.

This patent is subject to a terminal disclaimer.

(21) Appl. No.: 12/698,342

(22) Filed: Feb. 2, 2010

(65) Prior Publication Data

US 2010/0296843 A1 Nov. 25, 2010

(30) Foreign Application Priority Data

May 19, 2009 (JP) ................................ 2009-121455

(51) Int. Cl.
 *H01J 17/49* (2012.01)
 *H01J 1/02* (2006.01)
(52) U.S. Cl.
 USPC ............ 313/495; 313/326; 313/310; 313/497
(58) Field of Classification Search
 USPC .................... 313/310, 311, 495, 497
 See application file for complete search history.

(56) References Cited

U.S. PATENT DOCUMENTS

| | | | |
|---|---|---|---|
| 3,644,161 | A | 2/1972 | Hall |
| 4,857,161 | A | 8/1989 | Borel |
| 5,891,548 | A | 4/1999 | Graiver |
| 5,962,959 | A | 10/1999 | Iwasaki et al. |
| 6,023,124 | A | 2/2000 | Chuman et al. |
| 6,130,503 | A | 10/2000 | Negishi et al. |
| 6,166,487 | A | 12/2000 | Negishi et al. |
| 6,462,467 | B1 | 10/2002 | Russ |
| 6,626,724 | B2 | 9/2003 | Yamamoto et al. |
| 6,628,053 | B1 | 9/2003 | Den et al. |
| 6,803,707 | B2 | 10/2004 | Ishiwata et al. |
| 6,844,664 | B2 | 1/2005 | Komoda et al. |
| 7,723,909 | B2 | 5/2010 | Yamaguchi et al. |
| 8,110,971 | B2 | 2/2012 | Hirakawa et al. |
| 2001/0017369 | A1 | 8/2001 | Iwasaki et al. |

(Continued)

FOREIGN PATENT DOCUMENTS

| | | |
|---|---|---|
| CN | 1755889 A | 4/2006 |
| CN | 1763885 A | 4/2006 |

(Continued)

OTHER PUBLICATIONS

Notice of Allowance mailed Nov. 29, 2011 in U.S. Appl. No. 12/782,102.

(Continued)

*Primary Examiner* — Sikha Roy
(74) *Attorney, Agent, or Firm* — Nixon & Vanderhye P.C.

(57) ABSTRACT

An electron emitting element of the present invention includes an electron acceleration layer sandwiched between an electrode substrate and a thin-film electrode, and the electron acceleration layer includes a fine particle layer containing insulating fine particles and a basic dispersant. This makes it possible to provide an electron emitting element which does not cause insulation breakdown in an insulating layer and which can be produced at a low cost.

13 Claims, 12 Drawing Sheets

U.S. PATENT DOCUMENTS

| | | |
|---|---|---|
| 2001/0026123 A1 | 10/2001 | Yoneda |
| 2002/0070677 A1 | 6/2002 | Yamada et al. |
| 2002/0136896 A1 | 9/2002 | Takikawa et al. |
| 2003/0076023 A1 | 4/2003 | Komoda et al. |
| 2003/0102793 A1 | 6/2003 | Komoda et al. |
| 2004/0021434 A1 | 2/2004 | Yoneda |
| 2004/0046914 A1 | 3/2004 | Hirota |
| 2004/0150768 A1 | 8/2004 | Shimizu et al. |
| 2004/0197943 A1 | 10/2004 | Izumi |
| 2004/0201345 A1 | 10/2004 | Hirokado |
| 2004/0246408 A1 | 12/2004 | Ando |
| 2005/0181566 A1 | 8/2005 | Machida et al. |
| 2005/0212398 A1 | 9/2005 | Okano et al. |
| 2006/0012278 A1 | 1/2006 | Nanataki et al. |
| 2006/0061967 A1 | 3/2006 | Kim et al. |
| 2006/0065895 A1 | 3/2006 | Kusunoki et al. |
| 2006/0152138 A1 | 7/2006 | Hori et al. |
| 2006/0186786 A1 | 8/2006 | Iwamatsu et al. |
| 2006/0244357 A1 | 11/2006 | Lee |
| 2006/0284543 A1 | 12/2006 | Chung et al. |
| 2006/0290291 A1 | 12/2006 | Aizawa |
| 2006/0291905 A1 | 12/2006 | Hirakawa et al. |
| 2007/0210697 A1 | 9/2007 | Tamura et al. |
| 2007/0222067 A1 | 9/2007 | Nanataki et al. |
| 2009/0091526 A1 | 4/2009 | Hirota |
| 2010/0196050 A1 | 8/2010 | Iwamatsu et al. |
| 2010/0215402 A1 | 8/2010 | Nagaoka |
| 2010/0278561 A1 | 11/2010 | Kanda |
| 2010/0295465 A1 | 11/2010 | Hirakawa |
| 2010/0296842 A1 | 11/2010 | Imura |
| 2010/0296843 A1 | 11/2010 | Hirawaka et al. |
| 2010/0296844 A1 | 11/2010 | Imura |
| 2010/0296845 A1 | 11/2010 | Hirakawa |
| 2010/0307724 A1 | 12/2010 | Ichii et al. |
| 2010/0327730 A1 | 12/2010 | Hirakawa |

FOREIGN PATENT DOCUMENTS

| | | |
|---|---|---|
| CN | 1849673 A | 10/2006 |
| EP | 1617449 | 1/2006 |
| EP | 1 635 369 | 3/2006 |
| JP | 60-20027 A | 2/1985 |
| JP | 62-172631 | 7/1987 |
| JP | 1-107440 A | 4/1989 |
| JP | 1-149335 A | 6/1989 |
| JP | 01-279557 | 11/1989 |
| JP | 01-298623 | 12/1989 |
| JP | 6-255168 A | 9/1994 |
| JP | 8-97582 A | 4/1996 |
| JP | 8-250766 A | 9/1996 |
| JP | 9-007499 A | 1/1997 |
| JP | 9-252068 A | 9/1997 |
| JP | 10-121042 | 5/1998 |
| JP | 10-308164 A | 11/1998 |
| JP | 10-308165 | 11/1998 |
| JP | 10-308166 A | 11/1998 |
| JP | 11-251069 A | 9/1999 |
| JP | 2000-76986 A | 3/2000 |
| JP | 2000-311640 | 11/2000 |
| JP | 2001-68012 A | 3/2001 |
| JP | 2001-195973 A | 7/2001 |
| JP | 2001-357961 | 12/2001 |
| JP | 2002-93310 A | 3/2002 |
| JP | 2002-208346 A | 7/2002 |
| JP | 2002-279892 A | 9/2002 |
| JP | 2003-115385 | 4/2003 |
| JP | 2003-173744 A | 6/2003 |
| JP | 2003-173878 A | 6/2003 |
| JP | 2003-331712 | 11/2003 |
| JP | 2004-241161 | 8/2004 |
| JP | 2004-253201 A | 9/2004 |
| JP | 2004-296781 | 10/2004 |
| JP | 2004-296950 | 10/2004 |
| JP | 2004-327084 A | 11/2004 |
| JP | 2005-5205 A | 1/2005 |
| JP | 2005-190878 A | 7/2005 |
| JP | 2005-209396 A | 8/2005 |
| JP | 2005-268025 A | 9/2005 |
| JP | 2005-326080 A | 11/2005 |
| JP | 2005-328041 A | 11/2005 |
| JP | 1 617 450 A2 | 1/2006 |
| JP | 2006-054162 | 2/2006 |
| JP | 2006-100758 A | 4/2006 |
| JP | 2006-190545 A | 7/2006 |
| JP | 2006-236964 | 9/2006 |
| JP | 2006-351524 A | 12/2006 |
| JP | 2007-290873 | 11/2007 |
| JP | 2009-019084 A | 1/2009 |
| JP | 2009-092902 A | 4/2009 |
| JP | 2009-46891 A | 7/2009 |
| JP | 2009-146891 A | 7/2009 |
| JP | 4314307 B1 | 8/2009 |
| JP | 2010-267492 A | 11/2010 |
| TW | 1237722 | 8/2005 |
| TW | 1257117 | 6/2006 |
| TW | 200638455 A | 11/2006 |
| TW | 1278696 | 4/2007 |
| WO | 98/27568 A1 | 6/1998 |
| WO | 2005/004545 A1 | 1/2005 |
| WO | 2009/066723 | 5/2009 |

OTHER PUBLICATIONS

Notice of Allowance mailed Dec. 29, 2011 in U.S. Appl. No. 12/782,102.

Office Action mailed Nov. 29, 2011 in U.S. Appl. No. 12/698,435.

Office Action mailed Dec. 16, 2011 in U.S. Appl. No. 12/698,435.

U.S. Appl. No. 12/695,381, filed Jan. 28, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.

U.S. Appl. No. 12/696,905, filed Jan. 29, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.

U.S. Appl. No. 12/698,435, filed Feb. 2, 2010, entitled Electron Emitting Element and Method for Producing Electron Emitting Element.

U.S. Appl. No. 12/699,349, filed Feb. 3, 2010, entitled "Electron Emitting Element, Electron Emitting Device, Light Emitting Device, Image Display Device, Cooling Device, and Charging Device".

U.S. Appl. No. 12/956,136, filed Nov. 30, 2010, entitled "Electron Emitting Element, Method for Producing Electron Emitting Element, Electron Emitting Device, Charging Device, Image Forming Apparatus, Electron-Beam Curing Device, Image Display Device, Air Blowing Device, Cooling Device" (not yet published), Hiroyuki Hirakawa.

U.S. Appl. No. 12/940,546, filed Nov. 5, 2010, entitled "Heat Exchanger".

English version of ISR for PCT/JP2009/052904 mailed Apr. 21, 2009.

ISR for PCT/JP2008/071102, mailed Feb. 24, 2009 (081423/PCT).

Electrophotography-Bases and Applications (1998; p. 213), The Society of Electrophotography of Japan, Corona Publishing Co., Ltd. (with partial English translation).

Ionic winds for locally enhanced cooling, David B. Go, Suresh V. Garimella, and Timothy S. Fisher, J. Appl. Phys., 102, 053302 (2007).

Naoi et al, "TiO2 Films Loaded with Silver Nanoparticles: Control of Multicolor Photochromic Behavior" J. Am. Chem. Soc., vol. 126, No. 11, p. 3664-3668 (2004).

Yamaguchi and three others, "Development of Highly Efficient Electron-Beam Source by Use of Carbon Nanotube for Image Recording", Collected Papers of Japan Hardcopy 97, The Imaging Society of Japan, p. 221-224, Jul. 1997 (with partial English translation).

U.S. Appl. No. 12/781,997, filed May 18, 2010, entitled "Electron Emitting Element, Electron Emitting Device, Charging Device, Image Forming Apparatus, Electron-Beam Curing Device, Light Emitting Device, Image Display Device, Air Blowing Device, and Cooling Device".

U.S. Appl. No. 12/782,024, filed May 18, 2010, entitled "Light Emitting Element, Light Emitting Device, Image Display Device, Method of Driving Light Emitting Element, and Method of Producing Light Emitting Element".

U.S. Appl. No. 12/782,102, filed May 18, 2010, entitled "Electron Emitting Element, Electron Emitting Device, Light Emitting Device, Image Display Device, Air Blowing Device, Cooling Device, Charging Device, Image Forming Apparatus, and Electron-Beam Curing Device".

U.S. Appl. No. 12/743,741, filed May 19, 2010, entitled Electron Emitting Element, Electron Emitting Device, Light Emitting Device, Image Display Device, Air Blowing Device, Cooling Device, Charging Device, Image Forming Apparatus, Electron-Beam Curing Device, and Method for Producing Electron Emitting Element.

Naoi et al., "TiO2 Films Loaded with Silver Nanoparticles: Control of Multicolor Photochromic Behavior", J. AM. Chem. Soc., vol. 126, No. 11, pp. 3664-3668, (2004).

Yamaguchi et al, "Development of Highly Efficient Electron-Beam Source by Use of Carbon Nanotube for Image Recording", Collected Papers of Japan Hardcopy 97, The Imaging Society of Japan, Jul. 1997, pp. 221-224.

Office Action mailed May 17, 2012 in U.S. Appl. No. 12/698,435.

Restriction Requirement mailed Apr. 16, 2012 in U.S. Appl. No. 12/699,349.

Notice of Allowance mailed Apr. 17, 2012 in U.S. Appl. No. 12/781,997.

U.S. Office Action (Restriction Requirement) issued in co-pending U.S. Appl. No. 12/695,381, dated Sep. 7, 2012.

U.S. Office Action mailed Jun. 18, 2012 in U.S. Appl. No. 12/698,435.

U.S. Office Action mailed Jun. 22, 2012 in U.S. Appl. No. 12/743,741.

U.S. Office Action issued in co-pending U.S. Appl. No. 12/696,905, dated Sep. 28, 2012.

United States Final Office Action issued for corresponding U.S. Appl. No. 12/696,905; dated Mar. 14, 2013.

__US 8,476,818 B2__

ELECTRON EMITTING ELEMENT INCLUDING A FINE PARTICLE LAYER CONTAINING INSULATING PARTICLES, AND DEVICES AND METHODS RELATED THERETO

This Nonprovisional application claims priority under 35 U.S.C. §119(a) on Patent Application No. 2009-121455 filed in Japan on May 19, 2009, the entire contents of which are hereby incorporated by reference.

TECHNICAL FIELD

The present invention relates to an electron emitting element, an electron emitting device, a light emitting device, an image display device, an air blowing device, a cooling device, a charging device, an image forming apparatus, and an electron-beam curing device, each for emitting electrons by application of a voltage, and a method for producing the electron emitting element.

BACKGROUND ART

A Spindt-type electrode and a carbon nanotube electrode (CNT) have been known as conventional electron emitting elements. Applications of such conventional electron emitting elements to, for example, the field of Field Emission Display (FED) have been studied. Such electron emitting elements are caused to emit electrons by tunnel effect resulting from formation of an intense electric field of approximately 1 GV/m that is produced by application of a voltage to a pointed section.

However, each of these two types of the electron emitting elements has an intense electric field in the vicinity of a surface of an electron emitting section. Accordingly, electrons emitted obtain a large amount of energy due to the electric field. This makes it easy to ionize gas molecules. However, cations generated in the ionization of the gas molecules are accelerated in a direction of a surface of the electron emitting element due to the intense electric field and collide with the surface. This causes a problem of breakdown of the electron emitting element due to sputtering.

Further, ozone is generated before ions are generated, because oxygen in the atmosphere has dissociation energy that is lower than ionization energy. Ozone is harmful to human bodies, and oxidizes various substances because of its strong oxidizing power. This causes a problem in that members around the element are damaged. In order to prevent this problem, the members used around the electron emitting element are limited to members that have high resistance to ozone.

In order to solve this problem, an MIM (Metal Insulator Metal) type and an MIS (Metal Insulator Semiconductor) type have been known as other types of electron emitting elements. These electron emitting elements are surface-emission-type electron emitting elements which accelerate electrons by utilizing quantum size effect and an intense electric field in the electron emitting element so that electrons are emitted from a flat surface of the element. These electron emitting elements do not require an intense electric field outside the elements, because the electrons which are accelerated in respective electron acceleration layers inside the elements are emitted to the outside. Therefore, each of the MIM type and the MIS type electron emitting elements can overcome the problems such that (i) the element is broken down by the sputtering which occurs due to ionization of gas molecules and (ii) ozone is generated, in the Spindt-type, CNT type, and BN type electron emitting elements.

For example, Patent Literature 1 discloses an MIM type electron emitting element in which an insulating film having fine particles made of metal or the like dispersed therein is provided between two electrodes. The MIM type electron emitting element emits electrons in such a manner that electrons are injected from one (a substrate electrode) of the electrodes into the insulating film, the electrons thus injected are accelerated in the insulating film, and the electrons are emitted to outside through the other electrode (electron-emitting side electrode) having a thickness of several tens Å to 1000 Å.

CITATION LIST

Patent Literature 1

Japanese Patent Application Publication, Tokukaihei, No. 1-298623 A (Publication Date: Dec. 1, 1989)

SUMMARY OF INVENTION

Technical Problem

However, such a configuration of the electron emitting element disclosed in Patent Literature 1 employing the insulating film in which fine particles of metal or the like are dispersed causes the following problem. That is, in a case where the fine particles of metal or the like are poorly dispersed in the insulating film, insulation breakdown easily occurs in the insulating film.

Patent Literature 1 discloses the following 3 examples (1) through (3) as a method for producing the insulating film in which the fine particles of metal or the like are dispersed.

(1) A method in which metal fine particles are mixed in an insulating liquid coating agent so as to obtain a dispersion solution, and the dispersion solution is applied by a spin-coating method.

(2) A method in which a solution of an organic metal compound is mixed in an insulating liquid coating agent so as to obtain a dispersion solution, and the dispersion solution is applied and then thermally decomposed.

(3) A vacuum deposition method in which an insulating material is deposited by a plasma or thermal CVD method, or the like method.

Among these 3 examples, in the methods (1) and (2) that uses the dispersion solution, it is difficult to control dispersion of the fine particles of metal or the like in the insulating film, and therefore the fine particles easily cohere to each other. This is caused due to re-cohesion of the fine particles. That is, when solid fine particles are dispersed in a solvent, external force such as supersonic vibration is added so as to promote dispersion of the solid fine particles. However, if excessive external force is added, so-called excessive dispersion occurs, thereby damaging surfaces of the fine particles. In such a case, re-cohesion is easily caused. This re-cohesion more significantly occurs, as a particle diameter is smaller. A condition that can maintain a dispersion state of primary particles of the fine particles of metal or the like in the solvent is very limited.

Further, the method (3) can control dispersion of the fine particles. However, the following problem arises. That is, since the method uses a plasma CVD device or a thermal CVD device, in a case where a large size element is produced, a production cost is extremely increased as compared to the other methods.

The present invention is accomplished in view of the above problems. An object of the present invention is to provide an electron emitting element which does not cause insulation breakdown in an insulating layer and which can be produced at a low cost.

Solution to Problem

In order to achieve the above object, the inventors of the present invention diligently studied and found the following matter. That is, when (i) a layer of an insulating film provided between electrodes is a fine particle layer made of insulating fine particles and (ii) a basic dispersant is used as a dispersant for dispersing the insulating fine particles in a dispersion solution which is used for forming a layer of the fine particles, then it is possible to emit electrons even if fine particles of metal or the like are not dispersed in the insulating film. As such, the present invention is accomplished.

That is, an electron emitting element of the present invention includes: an electrode substrate and a thin-film electrode, which are provided so as to face each other; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including a fine particle layer containing insulating fine particles, the fine particle layer further containing a basic dispersant.

An electron emitting device of the present invention includes: the electron emitting element; and a power supply section for applying a voltage between an electrode substrate and a thin-film electrode provided in the electron emitting element.

Further, a light emitting device, an image display device, an air blowing device, a cooling device, a charging device, an image forming apparatus, and an electron-beam curing device, each employing the electron emitting device of the present invention, are included in the scope of the present invention.

A method of the present invention for producing an electron emitting element is a method for producing an electron emitting element that includes: an electrode substrate and a thin-film electrode, which are provided so as to face each other; and an electron acceleration layer provided between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, and the method of the present invention includes the steps of: (a) forming a fine particle layer serving as the electron acceleration layer on the electrode substrate with the use of an insulating fine particle dispersion solution in which insulating fine particles are dispersed in a solvent by use of a basic dispersant; and (b) forming the thin-film electrode on the fine particle layer.

Advantageous Effects of Invention

As described above, the electron emitting element of the present invention includes: an electrode substrate and a thin-film electrode, which are provided so as to face each other; and an electron acceleration layer sandwiched between them, and the electron acceleration layer includes a fine particle layer containing insulating fine particles, which fine particle layer further contains a basic dispersant.

In the configuration, by applying a voltage between the electrode substrate and the thin-film electrode, current flows in the electron acceleration layer. A part of electrons in the current becomes ballistic electrons due to an intense electric field formed by the applied voltage and the ballistic electrons are emitted from a side of the thin-film electrode.

Here, it is considered that an electron pair donor that donates a pair of electrons, included in the basic dispersant, causes electrons to be emitted from the electron emitting element. That is, the basic dispersant includes the electron pair donor that donates a pair of electrons, and the electron pair donor is ionized after donating the pair of electrons. It is considered that the ionized electron pair donor transfers electric charge on a surface of the insulating fine particle to which the electron pair donor is attached, thereby allowing electric conduction on the surface of the insulating fine particle.

Further, the electron acceleration layer is configured such that fine particles of metal or the like is not necessary to be dispersed in the electron acceleration layer. As a result, the electron emitting element of the present invention does not have such a problem that the fine particles of metal or the like cohere to one another and the cohesion causes insulation breakdown in the electron acceleration layer. Consequently, it is possible to configure the electron acceleration layer in which insulation breakdown hardly occurs, without using a plasma CVD device or a thermal CVD device.

In addition, since the dispersant, which is an essential component for dispersing insulating fine particles in a solvent, also works as the fine particles of metal or the like, it is possible to reduce production processes and a cost for materials.

As a result, it is advantageously possible to provide an electron emitting element in which insulation breakdown hardly occurs in an insulating layer and which can be produced at a low cost.

As has been already described in terms of the electron emitting element, the electron emitting element of the present invention is an electron emitting element in which insulation breakdown hardly occurs in an insulating layer and which can be produced with the use of an inexpensive device. Accordingly, an electron emitting device employing the electron emitting element is an electron emitting device in which insulation breakdown hardly occurs in an insulating layer and which can be produced with the use of an inexpensive device.

A light emitting device, an image display device, an air blowing device, a cooling device, a charging device, an image forming apparatus, and an electron-beam curing device, according to the present invention, each including the electron emitting device of the present invention also does not cause such a problem that insulation breakdown occurs in an insulating layer, and can be produced with the use of an inexpensive device.

With the method of the present invention for producing an electron emitting element, it is possible to produce an electron emitting element in which insulation breakdown hardly occurs in an insulating layer and which can be produced at a low cost.

DESCRIPTION OF EMBODIMENTS

With reference to FIGS. 1 through 15 explained are Embodiments and Examples of an electron emitting element and an electron emitting device, each according to the present invention. Note that Embodiments and Examples described below are merely specific examples of the present invention and by no means limit the present invention.

Embodiment 1

Figure 1:
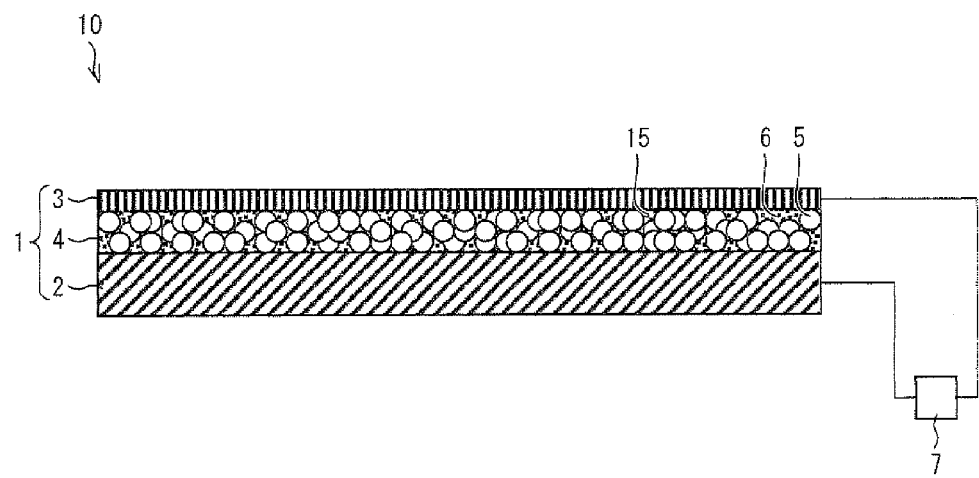
FIG. 1 is a schematic view illustrating a configuration of an electron emitting device including an electron emitting element according to one embodiment of the present invention.

FIG. 1 is a schematic view illustrating a configuration of an electron emitting device 10 including an electron emitting element 1 according to one embodiment of the present invention. As shown in FIG. 1, the electron emitting device 10 includes an electron emitting element 1 according to one embodiment of the present invention, and a power supply 7. The electron emitting element 1 includes: an electrode substrate 2 as a bottom electrode; a thin-film electrode 3 as an upper electrode; and an electron acceleration layer 4 sandwiched therebetween. Further, the electrode substrate 2 and the thin-film electrode 3 are connected to a power supply 7, so that a voltage can be applied between the electrode substrate 2 and the thin-film electrode 3 which are provided so as to face each other. The electron emitting element 1 applies a voltage between the electrode substrate 2 and the thin-film electrode 3 so that current flows between the electrode substrate 2 and the thin-film electrode 3, that is, in the electron acceleration layer 4. A part of electrons in the current are caused to transmit through the thin-film electrode 3 and/or be emitted through holes (gaps), in the thin-film electrode 3, which are formed due to gaps between insulating fine particles, or through uneven portions between the insulating fine particles, as ballistic electrons due to an intense electric field formed by the applied voltage.

The electrode substrate 2 serving as the lower electrode also acts as a supporting member of the electron emitting element, in addition to the function as the electrode. Accordingly, the electrode substrate 2 is not specifically limited in material as long as the material has a sufficient strength, excellent adhesiveness with respect to a substance in direct contact with the material and sufficient electrical conductivity. Examples of the electrode substrate include: metal substrates made of, for example, SUS, Ti, and Cu; and semiconductor substrates made of, for example, Si, Ge, and GaAs. In cases where an insulator substrate such as a glass substrate or a plastic substrate is used, an electrically conductive material such as metal may be attached, as an electrode, to a surface thereof (an interface of the insulator substrate and the electron acceleration layer 4). A constituent material of the electrically conductive material to be attached to the surface of the insulator substrate is not specifically limited as long as a thin film of a material excellent in electrical conductivity can be formed by magnetron sputtering or the like. Note that, if steady operation of the electron emitting element in the atmosphere is desired, a conductor having high resistance to oxidation is preferably used and noble metal is more preferably used as the constituent material. An ITO thin-film which is widely used as an electrically conductive oxide material for a transparent electrode is also applicable. Alternatively, it is possible to use a metal thin film obtained by first forming a Ti film of 200 nm on a surface of a glass substrate and then forming a Cu film of 1000 nm on the Ti film, because a strong thin film can be formed. In this case, materials and values are not specifically limited to those described above.

The thin-film electrode 3 is for applying a voltage in the electron acceleration layer 4. Accordingly, a material of the thin-film electrode 3 is not specifically limited as long as the material makes it possible to apply a voltage. A material which has a low work function and from which a thin-film can be formed is expected to provide a greater effect, in view of emitting, with a minimum energy loss, electrons which have high energy due to acceleration within the electron acceleration layer 4. Examples of such a material include: gold, silver, carbon, tungsten, titanium, aluminum, and palladium each of which has a work function in a range of 4 eV to 5 eV. Among these materials, in particular, in consideration of an operation under an atmospheric pressure, the best material is gold which is free from oxide or sulfide formation reaction. Further, silver, palladium, or tungsten each of which has a relatively small oxide formation reaction is also applicable material that can be used without any problem.

The thickness of the thin-film electrode 3 is important as a condition to efficiently emit electrons from the electron emitting element 1 to the outside, and is preferably in a range from 10 to 100 nm. A minimum thickness necessary for the thin-film electrode 3 to serve as a plane electrode is 10 nm, and a thickness below 10 nm does not allow the thin-film electrode 3 to maintain its electrical conductivity. Meanwhile, a maximum thickness of the thin-film electrode 3 that causes electrons to be emitted to the outside from the electron emitting element 1 is 100 nm. If the thickness of the thin-film electrode 3 is over 100 nm, emission of ballistic electrons is extremely reduced. It is considered that the reduction of the emission of ballistic electrons is caused because the thin-film electrode 3 absorbs the ballistic electrons, or the ballistic electrons is reflected by the thin-film electrode 3 so that the electron acceleration layer 4 receives the ballistic electrons again.

Figure 2:
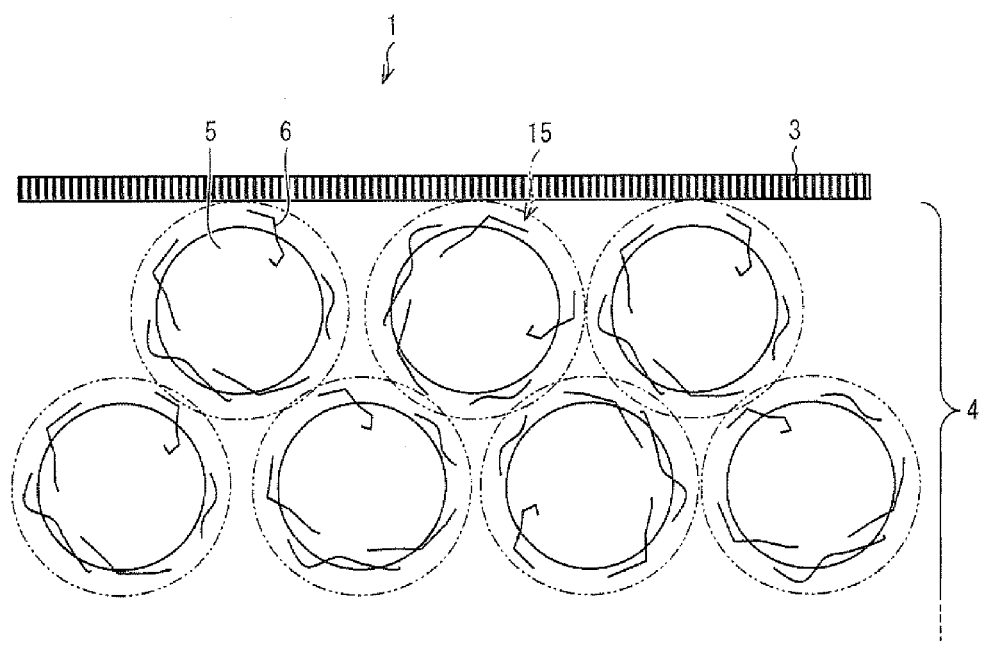
FIG. 2 is a schematic view illustrating the vicinity of an electron acceleration layer in the electron emitting element included in the electron emitting device of FIG. 1.

As illustrated in FIG. 2, the electron acceleration layer 4 is constituted by a fine particle layer containing insulating fine particles 5 (includes a fine particle layer containing insulating fine particles 5), and the fine particle layer includes a basic dispersant 6 which prevents cohesion of the insulating fine particles 5 in a solvent and which causes the insulating fine particles to be dispersed in the solvent. FIG. 2 is a schematic view magnifying the vicinity of the electron acceleration layer 4 in the electron emitting element 1.

A material of the insulating fine particles 5 is not specifically limited as long as the material has an insulating property. For example, $SiO_2$, $Al_2O_3$, and $TiO_2$ are practically used. However, in a case where surface-treated silica particles having a small particle diameter are used, a surface area of the surface-treated silica particles is increased in a solvent and solution viscosity increases as compared to a case where spherical silica particles having a particle diameter larger than that of the surface-treated silica particles are used. As a result, a thickness of the electron acceleration layer 4 tends to increase slightly. Further, fine particles made of an organic polymer can be used as the material of the insulating fine particles 5. Examples of such fine particles that can be used are cross-linked fine particles (SX 8743) made of stylene/divinylbenzene manufactured and marketed by JSR Corporation, or Fine Sphere series which are styrene acryl fine particles manufactured and marketed by NIPPON PAINT Co., Ltd.

In the present embodiment, particles that may be used as the insulating fine particles 5 include (i) two or more different kinds of particles, which are different in quality of materials, (ii) particles having different peaks in diameter, or (iii) one kind of particles whose distribution of diameters is broad. An average particle diameter of the insulating fine particles 5 is preferably in a range from 10 nm to 1000 nm, and more preferably 10 nm to 200 nm.

In the present invention, the basic dispersant 6 has functions as follows: (i) a primary function as a dispersant that successfully disperses, in a solvent, the insulating fine particles 5 that easily cohere to one another, thereby realizing formation of a very smooth fine particle layer on a surface of the electrode substrate 2; and (ii) an additional function that allows electrical conduction on surfaces of the insulating fine particles 5.

The basic dispersant 6 includes a polymer and an electron pair donor that is introduced into a part of the polymer. The polymer provides dispersibility due to its steric repulsion effect. In FIG. 2, a referential numeral 15 indicates a region where a steric hindrance formed between the insulating fine particles 5 is caused. The electron pair donor functions as an anchor that adsorbs to the insulating fine particle 5. Further, after donating a pair of electrons, the electron pair donor becomes a positive ion, thereby allowing ion conduction. It is presumed that the function that allows electric conduction on the surfaces of the insulating fine particles 5 is caused because a part, in the basic dispersant 6, that allows the ion conduction transfers electric charge. Further, the ion conductive parts in the basic dispersant 6 electrically repulse one another, thereby contributing to the dispersion of the insulating fine particles.

An electron pair donating part is a specific substituent having an electron donating substituent, which may be, for example, a pi electron system, such as a phenyl group or a vinyl group, an alkyl group, an amino group, or the like.

Examples of commercially available products of the basic dispersant 6 that can be applied to the present invention encompass: products manufactured by Avecia K.K. (SOLSPERSE disperses, such as SOLSPERSE 9000, 13240, 13940, 20000, 24000, 24000GR, 24000SC, 26000, 28000, 32550, 34750, 31845, and the like); products manufactured by BYK chemie (DISPERBYK 106, 112, 116, 142, 161, 162, 163, 164, 165, 166, 181, 182, 183, 184, 185, 191, 2000, 2001); products manufactured by Ajinomoto Fine-Techno Co., Inc. (AJISPER PB711, PB411, PB111, PB821, PB822); and products manufactured by EFKA chemicals (EFKA-47, 4050).

A content of the basic dispersant 6 in the electron acceleration layer 4 is an important control factor, in terms of controlling an amount of electrons emitted, because the content relates to easiness in flow of current in the electron emitting element, which is correlated with the amount of electrons emitted.

Addition of the basic dispersant 6 to the electron acceleration layer 4 is carried out in course of dispersing, in a solvent, the insulating fine particles 5 to form the electron acceleration layer 4. That is, a necessary amount of the basic dispersant 6 is added to a solvent to be used and then dispersed in the solvent, so as to prepare a dispersant-containing solvent. Subsequently, the insulating fine particles 5 are added to the dispersant-containing solvent and then sufficiently dispersed in the dispersant-containing solvent so that the basic dispersant 6 adheres to the surfaces of the insulating fine particles 5. An amount of the dispersant adhering to the surfaces of the insulating fine particles 5 can be controlled by controlling an additive amount of the dispersant added to the solvent. However, the additive amount of the dispersant is not proportional to easiness in current flow in the electron acceleration layer 4, which is obtained after the dispersant is added. That is, the easiness in current flow has a peak at a point when the additive amount of the dispersant reaches a certain amount. In a case where the additive amount is insufficient, the number of electron carriers is insufficient, thereby resulting in that an amount of current flowing in the electron acceleration layer 4 is naturally small. On the other hand, in a case where the additive amount is excessive, a component of the polymer included in the basic dispersant intensely works as a resistive component with respect to the current flowing in the element, thereby reducing a current value.

As such, there is an optimal value in the additive amount of the basic dispersant 6. The optimal value is set in view of the amount of current flowing in the element, and therefore depends on the situation. However, under conditions for forming, by the spin-coating method, the electron acceleration layer 4 by dropping a dispersion solution in which the insulating fine particles 5 are dispersed, the basic dispersant 6 is contained in the solvent preferably by 0.4 wt % to 10 wt %, and more preferably by 1 wt % to 5 wt %.

In a case where the basic dispersant 6 is contained in the solvent by less than 0.4 wt %, a sufficient amount of current flowing in the electron acceleration layer cannot be obtained, thereby resulting in that the electron emitting element 1 may not emit electrons at all. In a case where the basic dispersant 6 is contained more preferably by not less than 1 wt %, it is possible to obtain stable electron emission from the electron emitting element 1. On the other hand, in a case where the basic dispersant 6 is contained by more than 10%, a resistive component of the polymer included in the basic dispersant 6 may cause the current in the element to be difficult to flow. This may cause decrease in electron emission from the electron emitting element 1. In a case where the basic dispersant is contained more preferably by 5 wt %, it is advantageously possible to obtain electron emission from the electron emitting element 1 without any decrease in the amount of the electrons emitted.

In a case where a voltage applied between the electrode substrate 2 and the thin-film electrode 3 is constant, the thinner the electron acceleration layer 4 is, the more intense the electric field becomes. That is, by forming the electron acceleration layer 4 to have a thin thickness, it is possible to accelerate electrons by applying an intense electric field while a voltage applied between the electrode substrate 2 and the thin-film electrode 3 is maintained low. On the other hand, a layer thickness of the electron acceleration layer 4 should be made even, and further resistance of the electron acceleration layer 4 in a layer thickness direction should be controllable. In view of this, it is preferable that the electron acceleration layer 4 have a thickness in a range of 12 nm to 6000 nm, and more preferably 300 nm to 2000 nm.

As described above, in the electron emitting element 1 of the present embodiment, the electron acceleration layer 4 is configured such that, even if a dispersion state is poor, the basic dispersant 6 allows electric conduction on the surfaces of the insulating fine particles 5 without using fine particles of metal or the like that may cause insulation breakdown in an insulating film.

As a result, even if the electron acceleration layer 4 is formed by an inexpensive method, such as the spin-coating method, it is possible to produce an electron emitting element that can hardly cause insulation breakdown in the electron acceleration layer 4. Besides, the dispersant, which is a necessary member for dispersing the insulating fine particles in the solvent, also functions as fine particles of metal or the like. With the result that, it is possible to reduce production processes and cost for materials.

The following explanation deals with a principle of the electron emission, with reference to FIG. 2. As illustrated in FIG. 2, the electron acceleration layer 4 is made mostly of the insulating fine particles 5, and the basic dispersant 6 adheres to the surfaces of the insulating fine particles 5. This forms a region 15 where a steric hindrance is caused due to the basic dispersant 6 is formed on the surface of the insulating fine particle 5, thereby allowing the insulating fine particles 5 to be successfully dispersed in the solvent. Further, the insulating fine particles 5 have an insulation property. However, an ion conductive part of the basic dispersant 6 adhering to the surface of the insulating fine particle 5 transfers electric charge, thereby resulting in that the electron acceleration layer 4 has a semi-conductive property. Therefore, a voltage application to the electron acceleration layer 4 causes very weak current flow. A volt-ampere characteristic of the electron acceleration layer 4 shows a so-called varistor characteristic, and a current value sharply increases as an applied voltage increases. A part of electrons in the current become ballistic electrons due to an intense electric field formed within the electron acceleration layer 4 by the applied voltage. The ballistic electrons are caused to pass (transmit) through the thin-film electrode 3 and are emitted to the outside of the electron emitting element 1, or are emitted from holes (gaps) in the thin-film electrode 3. A generation process of the ballistic electrons has not been determined, but it is considered that the ballistic electrons are generated by simultaneous acceleration and tunneling of electrons in a direction of an electric field.

The following explains about one embodiment of a method for producing the electron emitting element 1.

Initially, a basic dispersant 6 is poured into a dispersion solvent, and the dispersion solvent is set in an ultrasonic dispersion device so that the basic dispersant 6 is dispersed in the solvent. Then, insulating fine particles 5 are poured therein and further set in the ultrasonic dispersion device so that the insulating fine particles 5 are dispersed in the solvent. Thus, an insulating fine particle dispersion solution A is prepared. A dispersing method thereof is not limited in any particular manner, and the basic dispersant 6 and the insulating fine particles 5 may be dispersed by a method other than the method using the ultrasonic dispersion device.

The dispersion solvent is not particularly limited provided that the dispersion solvent is compatible with the basic dispersant 6, allows the insulating fine particles 5 to be effectively dispersed therein, and further evaporates after the dispersion solvent is applied. For example, toluene, benzene, xylene, hexane, tetradecane, and the like can be used as the dispersion solvent.

The insulating fine particle dispersion solution A thus prepared is applied to an electron substrate 2, so as to form an electron acceleration layer 4. An application method thereof may be, for example, a spin-coating method. That is, the insulating fine particle dispersion solution A is dropped onto the electrode substrate 2 and forms a thin film as the electron acceleration layer 4 by use of the spin-coating method. The successive processes of dropping the insulating fine particle dispersion solution A, forming a film by the spin-coating method, and drying the film are repeatedly carried out several times so as to form a film having a predetermined thickness.

The formation of the electron acceleration layer 4 can be also carried out by a drop method, a spray-coating method, or the like, besides the spin-coating method.

After the electron acceleration layer 4 is formed as such, a thin-film electrode 3 is formed on the electron acceleration layer 4. The thin-film electrode 3 may be formed, for example, by magnetron sputtering. Other than the magnetron sputtering, the thin-film electrode 3 can be formed, for example, by an inkjet method, a spin-coating method, a vapor deposition method, or the like.

Further, the electron emitting element 1 including a fine particle layer (including the insulating fine particles and the basic dispersant provided on the surfaces of the insulating fine particles), illustrated in FIG. 2, may be configured such that a basic dispersant is further applied on a surface side of the fine particle layer in a discrete manner. When the electron acceleration layer 4 is configured as such, it is possible to control from which positions electrons are emitted, thereby making it possible to prevent a phenomenon that a constituent metal material of the thin-film electrode 3 wears off due to the emitted electrons. Further, it is possible to control an amount of the electrons emitted per unit area.

The discrete arrangement of the basic dispersant can be formed in such a manner that the fine particle layer is initially formed, as illustrated in FIG. 2, followed by applying the basic dispersant thereto by use of an inkjet method or an electrostatic atomization method. On this account, it does not matter whether the basic dispersant included in the fine particle layer and the basic dispersant applied afterward onto the surface of the fine particle layer by use of the inkjet method or the electrostatic atomization method may be the same or different from each other.

With the method for applying the basic dispersant in a discrete manner by use of the inkjet method or the electrostatic atomization method, there may be a case where a dispersion state of the insulating fine particles in the fine particle layer cannot be maintained due to a physical impact or the like that the fine particle layer receives when the basic dispersant is applied.

In view of this, in the case where the basic dispersant is discretely arranged on the surface side of the fine particle layer, the fine particle layer illustrated in FIG. 2 may be configured so as to contain binder resin that binds the insulating fine particles 5 to one another, and the basic dispersant 6 may be discretely provided on the surface of the fine particle layer solidified by the binder resin as such.

In the fine particle layer containing the binder resin, the dispersion state of the insulating fine particles 5 is maintained. As a result, even if the basic dispersant 6 is applied afterward by use of the inkjet method or the electrostatic atomization method, the dispersion state of the insulating fine particles in the fine particle layer does not change.

The binder resin may be any material, as long as the material has an insulating property and sufficient adhesiveness with respect to the electrode substrate 2 and the insulating fine particles 5 can be dispersed in the binder resin. The binder resin may be such as: tetramethoxysilane, tetraethoxysilane, methyltrimethoxysilane, methyltriethoxysilane, phenyltriethoxysilane, hexyltrimethoxysilane, decyltrimethoxysilane, hydrolysable group-containing siloxane, vinyltrimethoxysilane, vinyltriethoxysilane, 2-(3,4epoxycyclohexyl ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropyltrimethoxysilane, 3-methacryloxypropylethoxysilane, 3-acryloxypropyltrimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-ureidopropyltriethoxysilane, 3-chloropropyltrimethoxysilane, 3-mercaptopropyltrimethoxysilane, bis(triethoxysilylpropyl)tetrasulfide, and 3-isocyanatepropyltriethoxysilane. The above resin binders can be used solely or in combination of two or more kinds.

Example 1

The following explains about a measurement result on how an additive amount of the basic dispersant 6 is related to an amount of electrons emitted, by changing the additive amount of the basic dispersant 6 in the insulating fine particle dispersion solution.

Electron emitting elements 1 were prepared such that toluene was used as a solvent and the additive amounts of the basic dispersant 6 were set, respectively, to 0 wt %, 0.08 wt %, 0.4 wt %, and 1.0 wt %, with respect to the solvent. These electron emitting elements 1 thus prepared were subjected to an electron emission experiment in vacuum of $1\times10^{-8}$ ATM. As the basic dispersant 6, "pigment dispersant AJISPER PB821" (manufactured and marketed by Ajinomoto Fine-Techno Co., Inc.) was used. The "pigment dispersant AJISPER PB821" is a dispersant in which an amine number is 10 to 17 mgKOH/g and which has an straight or branched alkyl group or a phenyl group in a part of a linear polymer.

Initially explained is a detailed production condition of the electron emitting element 1.

Into a 10-mL reagent bottle, 3 g of a toluene solvent was added, and 0.03 g of AJISPER PB821 (manufactured by Ajinomoto Fine-Techno Co., Inc.) was also added thereto. The reagent bottle was then set in an ultrasonic dispersion device so that the AJISPER PB821 was dispersed in the solvent. After that, 0.25 g of silica particles as the insulating fine particles 5 were added thereto, and the reagent bottle was again set to the ultrasonic dispersion device so that the silica particles were dispersed. The silica particles are fumed silica C413 (manufactured by Cabot Corporation) having a diameter of 50 nm, and surfaces of the silica fine particles are subjected to a hexamethyldisilazane treatment. The reagent bottle was processed in the dispersing device for about 10 minutes, so that the silica particles were translucently dispersed in the toluene solvent. Thus, an insulating fine particle dispersion solution in which the additive amount of the basic dispersant 6 was 1.0 wt % with respect to the solvent was prepared.

Then, a 25 mm square glass substrate on which an ITO thin film was vapor-deposited was prepared as the electrode substrate 2. The insulating fine particle dispersion solution thus prepared was dropped onto a surface of the glass substrate so as to form a fine particle layer by use of a spin-coating method. A film-forming condition in the spin-coating method was such that the dispersion solution was dropped onto the surface of the glass substrate while the glass substrate was rotated at 500 RPM for 5 second, and then the glass substrate was rotated at 3000 RPM for 10 seconds. The process was repeated 3 times under the above film-forming condition so that 3 layers of the fine particle layer were deposited on the glass substrate, and then the layers were dried naturally at a room temperature. Thus formed fine particle layer serving as the electron acceleration layer 4 had a thickness of about 1000 nm.

After the fine particle layer was formed on the surface of the glass substrate, the thin-film electrode 3 was formed by use of a magnetron sputtering device. A material of the thin-film electrode 3 was gold (Au), and the thin-film electrode 3 was formed so as to have a thickness of 50 nm and an area of 0.014 cm$^2$. In this way, the electron emitting element 1 with the additive amount of the dispersant of 1.0 wt % was obtained.

Further, electron emitting elements 1 respectively with the dispersant additive amount of 0 wt %, 0.08 wt %, and 0.4 wt % were prepared in the same manner as above except that the additive amount of AJISPER PB821 with respect to the toluene solvent was changed to 0 wt %, 0.08 wt %, and 0.4 wt %, respectively.

Figure 3:
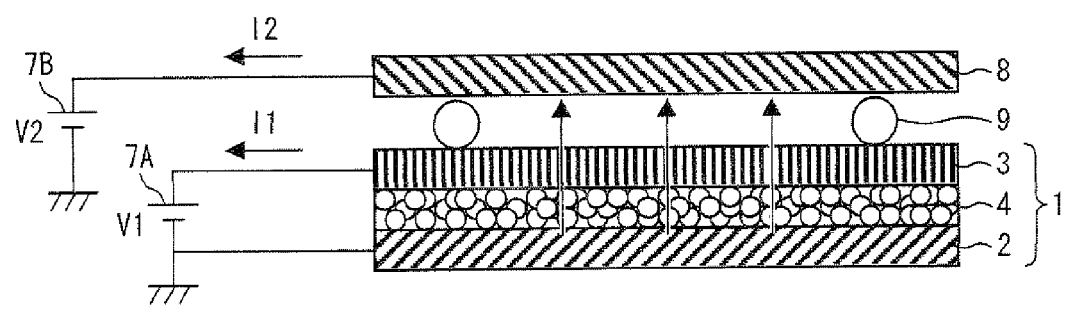
FIG. 3 is a diagram illustrating a measurement system of an electron emission experiment carried out with respect to an electron emitting element.

With respect to these 4 electron emitting elements 1 thus prepared, an electron emission experiment was carried out by use of a measurement system illustrated in FIG. 3.

115* FIG. 3 shows a measurement system used for the electron emission experiment. The measurement system in FIG. 3 is such that a counter electrode 8 is disposed on a side of the thin-film electrode 3 of the electron emitting element 1 with insulating spacers 9 (diameter: 1 mm) sandwiched between the thin-film electrode 3 and the counter electrode 8. A voltage V1 is to be applied, from a power supply 7A, between the electrode substrate 2 and the thin-film electrode 3 of the electron emitting element 1, while a voltage V2 is to be applied, from a power supply 7B, to the counter electrode 8. Then, (i) current I1 flowing between the thin-film electrode 3 and the power supply 7A, as current in the element, and (ii)

current I2 flowing between the counter electrode 8 and the power supply 7b, as electron emission current, were measured. The current emission experiment was carried out in such a manner that the measurement system was placed in vacuum of $1\times10^{-8}$ ATM.

Figure 4:
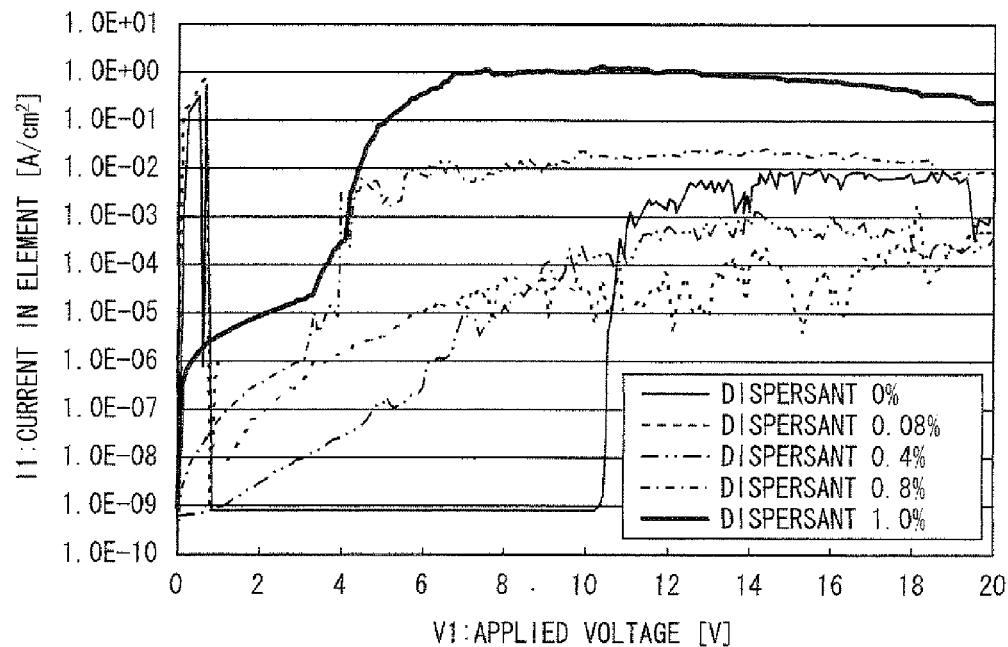
FIG. 4 is a measurement result of current in an electron emitting element produced by changing, within a range from 0 wt % to 1.0 wt %, a content of a basic dispersant with respect to a solvent, in an insulating fine particle dispersion solution used for forming an electron acceleration layer.

FIG. 4 shows a measurement result, in the electron emission experiment, of the current I1 in each of the electron emitting elements 1. Here, the applied voltage V1 was increased to 20 V in a stepwise manner, and the applied voltage V2 was 100 V. Further, FIG. 5 shows a measurement result, in the electron emission experiment, of the electron emission current I2 of each of the electron emitting elements 1.

As shown in FIG. 4, it is demonstrated that the current I1 [$A/cm^2$] in the element increases in proportion to the additive amount of the dispersant in a region where the applied voltage V1 is more than 10 V. In the electron emitting element 1 with the dispersant additive amount of 0, no current flows (the current is below the lower limit in the measurement) when the applied voltage V1 is in a range of 0 V to 10 V, while the current suddenly increases when the applied voltage V1 is over 10 V. It is considered that in the electron emitting element with the dispersant additive amount of 0, a poor dispersion state of the insulating fine particles causes local insulation breakdown, such as intensive current leakage at a very thin portion of the electron acceleration layer 4 or current leakage right below an electrode terminal to which the voltage is applied.

Figure 5:
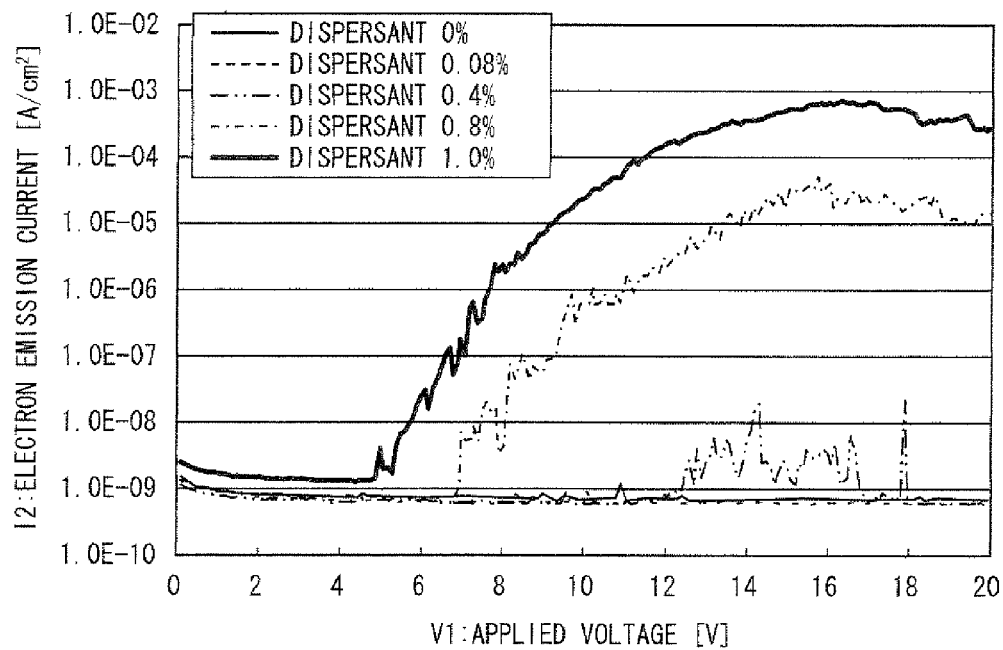
FIG. 5 is a measurement result of electron emission current from an electron emitting element produced by changing, within a range from 0 wt % to 1.0 wt %, a content of a basic dispersant with respect to a solvent, in an insulating fine particle dispersion solution used for forming an electron acceleration layer.

Further, as shown in FIG. 5, although the current I1 in the element flowed, no electron emission was measured in the electron emitting elements 1 with the dispersant additive amount of 0 and 0.08 wt %. In the electron emitting element 1 with the dispersant additive amount of 0.4 wt %, electron emission of $1\times10^{-8}$ [$A/cm^2$] was measured when the applied voltage was over 12 V. Further, in the electron emitting element 1 with the dispersant additive amount of 1.0 wt %, electron emission of 0.71 [$mA/cm^2$] was obtained at 16.3 V of the applied voltage V1.

Further, electron emitting elements 1 with the dispersant additive amount of 1.2 wt %, 5.0 wt %, 10.0 wt %, and 20.0 wt %, respectively, were prepared with the use of toluene as a solvent, in the same manner as above except that the additive amount of AJISPER PB821 with respect to the toluene solvent was changed to of 1.2 wt %, 5.0 wt %, 10.0 wt %, and 20.0 wt %, respectively.

The electron emission experiment was carried out with respect to these electron emitting elements 1 in vacuum of $1\times10^{-8}$ ATM. The measurement system used here and detailed conditions for forming the electron emitting elements 1 are the same as in the above experiment.

Figure 6:
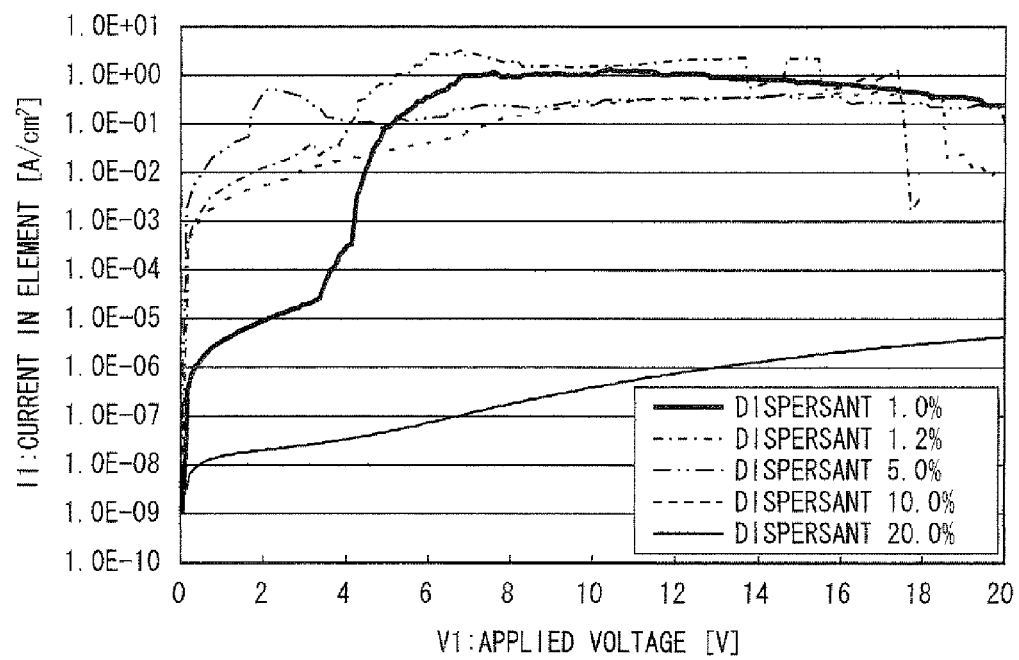
FIG. 6 is a measurement result of current in an electron emitting element produced by changing, within a range from 1.0 wt % to 20.0 wt %, a content of a basic dispersant with respect to a solvent, in an insulating fine particle dispersion solution used for forming an electron acceleration layer.
Figure 7:
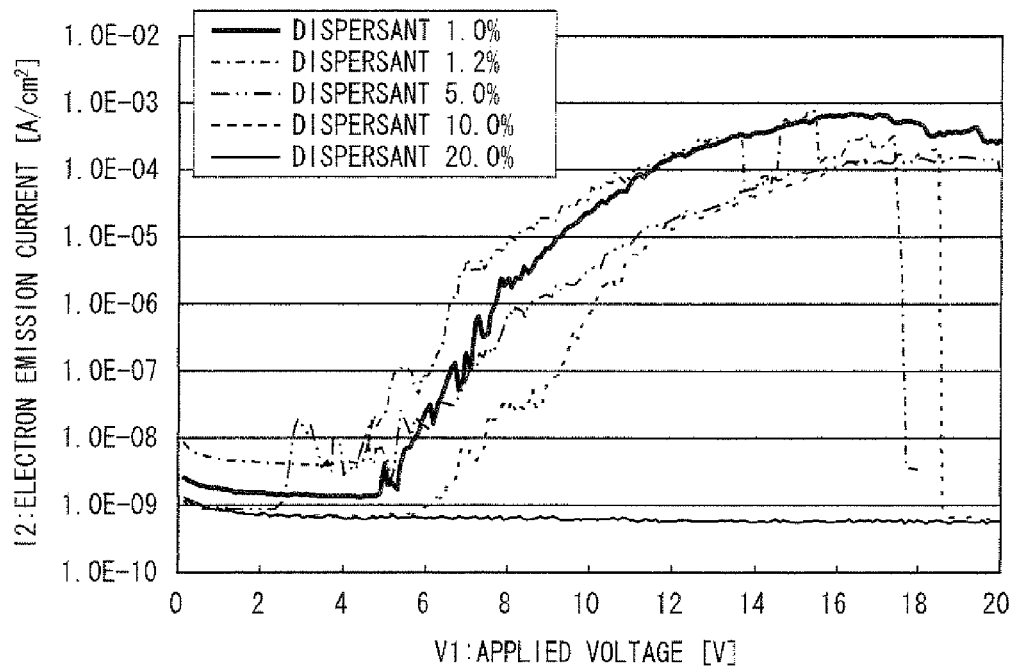
FIG. 7 is a measurement result of electron emission current in an electron emitting element produced by changing, within a range from 1.0 wt % to 20.0 wt %, a content of a basic dispersant with respect to a solvent, in an insulating fine particle dispersion solution used for forming an electron acceleration layer.

FIG. 6 shows a measurement result, in the electron emission experiment, of current I1 in each of the electron emitting elements 1 with the dispersant additive amount of 1.2 wt %, 5.0 wt %, 10.0 wt %, and 20.0 wt %. Here, an applied voltage V1 was increased from 0 V to 20 V in a stepwise manner, and an applied voltage V2 was 100 V. Further, FIG. 7 shows a measurement result, in the electron emission experiment, of electron emission current I2 of each of the electron emitting elements 1. FIGS. 6 and 7 also show the result of the electron emitting element 1 with the dispersant additive amount of 1.0 wt %, obtained in the aforementioned electron emission experiment, for comparison.

As shown in FIG. 6, the current I1 [$A/cm^2$] in the element exhibited its peak in the electron emitting element 1 with the dispersant additive amount of 1.2 wt %. However, the more the dispersant additive amount increased, the less the current I1 in the element became. This is because when the additive amount of the basic dispersant 6 is excessive, a resistive component in a polymeric material included in the dispersant works to reduce the current in the element. Further, as shown in FIG. 7, the electron emission current (an amount of electrons emitted) I2 exhibited a tendency according to an order of the current I1 in the element. In the electron emitting element 1 with the dispersant additive amount of 1.2 wt %, breakage of the electron emitting element 1 along with the electron emission was caused (the electron acceleration layer 4 made of fine particles was scattered) when the applied voltage was over 12 V, thereby resulting in that its electron emission characteristic was below data of the electron emitting element with the dispersant additive amount of 1.0 wt %.

Example 2

An electron emitting element 1 with the disperse additive amount of 1.0 wt % was prepared in the same manner as Example 1 except that AJISPER PB822 (manufactured by Ajinomoto Fine-Techno Co., Inc), whose production number and amine number are from the one used in Example 1, was used as the basic dispersant, and a voltage-current characteristic thereof was examined. As a result of the examination, the electron emitting element 1 in Example 2 exhibited a result similar to that of the electron emitting element 1 with the dispersant additive amount of 1.0 wt % in Example 1.

Comparative Example

Into a 10-mL reagent bottle, 3.0 g of a toluene solvent was added, and 0.25 g of silica fine particles (fumed silica C413 having a diameter of 50 nm (manufactured by Cabot Corporation); surfaces of the silica fine particles are subjected to a hexamethyldisilazane treatment) was added thereto as the insulating fine particles 5. The reagent bottle was set to an ultrasonic dispersion device so that the silica fine particles were dispersed. After about 10 minutes later, 0.065 g of silver nanoparticles (an average diameter of 10 nm; in the silver nanoparticle, a thickness of insulating coating alcoholate is 1 nm; manufactured by Ouyou Nano Particle Laboratory) was added to the reagent bottle. The reagent bottle was then subjected to an ultrasonic dispersion process for about 20 minutes, so as to prepare an insulating fine particle/conductive fine particle dispersion solution. In this case, the sliver nanoparticles was contained by about 20% with respect to total weight of the silica fine particles.

Then, a 30 mm square stainless substrate was prepared as the electrode substrate 2. Thus prepared insulating fine particle/conductive fine particle dispersion solution was dropped onto a surface of the stainless substrate by use of the spin-coating method, so as to form a fine particle layer. A film-forming condition in the spin-coating method was such that the dispersion solution was dropped onto the surface of the stainless substrate while the stainless substrate was rotated at 500 RPM for 5 second, and then the stainless substrate was rotated at 3000 RPM for 10 seconds. The process was repeated twice under the film-forming condition so that 2 layers of the fine particle layer were deposited on the stainless substrate, and the layers were then dried naturally at a room temperature.

After the fine particle layer was formed on the surface of the stainless substrate, the thin-film electrode 3 was formed by use of a magnetron sputtering device. A material of the thin-film electrode 3 was gold (Au), and the thin-film electrode 3 was formed in a round shape having a thickness of 45 nm and an area of 0.071 $cm^2$. In this way, the electron emitting element of Comparative Example in which the electron acceleration layer 4 included the conductive fine particles was obtained.

Figure 8:
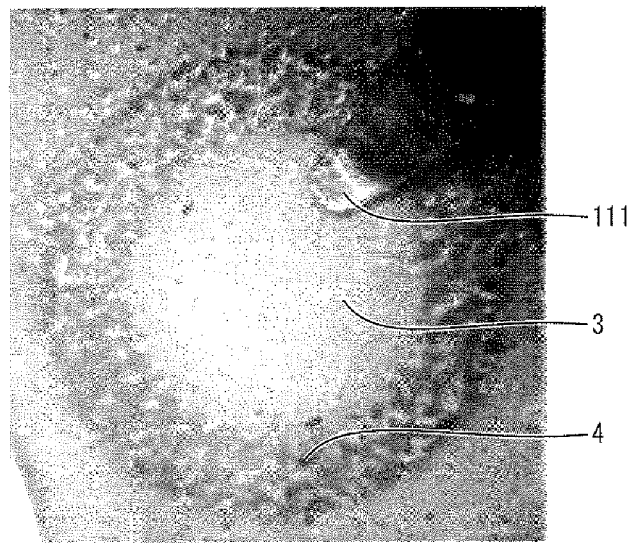
FIG. 8 is a picture magnifying a surface state of an electron emitting element in Comparison Example.

FIG. 8 is a picture of a surface of the electron emitting element of Comparative Example. In FIG. 8, a round-shape object is the thin-film electrode 3, and a ring around the round-shaped object is a surface of a part of the electron acceleration layer 4 on which part the thin film electrode 3 is not provided. Moreover, a member indicated by a referential numeral 111 is a contact probe that applies a voltage by contact with the thin-film electrode 3. From FIG. 8, it is shown that a surface of the electron emitting element of Comparative Example is rough.

The electron emission experiment was carried out with respect to thus formed electron emitting element of Comparative Example, with the use of the measurement system illustrated in FIG. 3.

Figure 9:
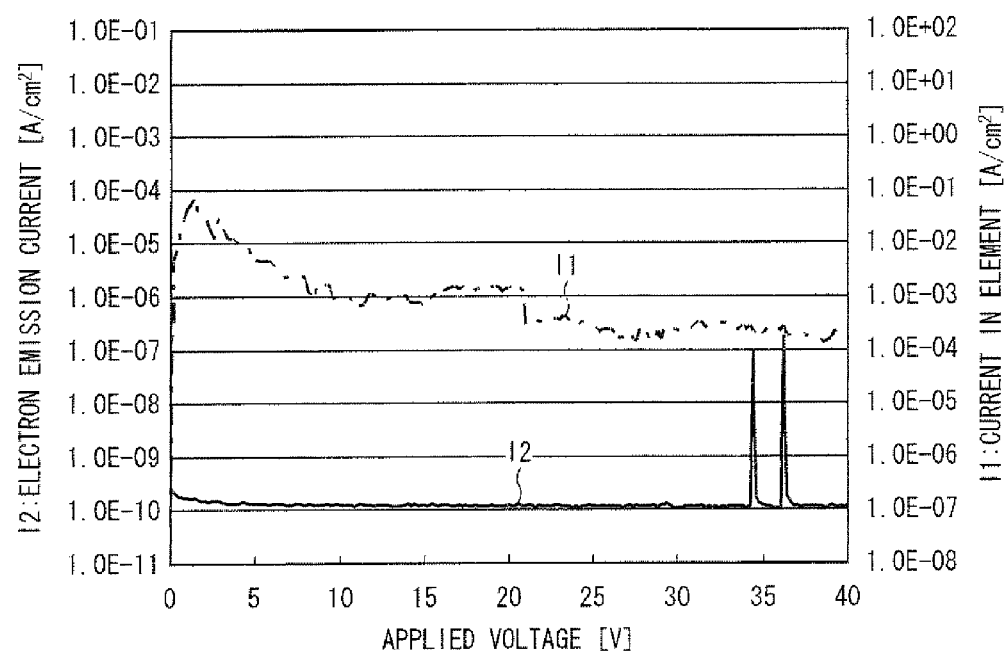
FIG. 9 is a measurement result of current in an element and electron emission current, each in the electron emission element in Comparative Example.

FIG. 9 shows a measurement result of current I1 in the electron emitting element of Comparative Example and a measurement result of electron emission current I2 emitted from the electron emitting element. An applied voltage V1 was increased from 0 V to 40 V in a stepwise manner, and an applied voltage V2 was 100 V.

As shown in FIG. 9, the electron emitting element of Comparative Example could not flow sufficient current I1 in the element. This is presumably because (i) the electron acceleration layer could not maintain a sufficient conduction state as the surface of the element was rough due to re-cohesion of the fine particles and (ii) an electronic conductive characteristic of the fine particle layer serving as the electron acceleration layer decreased as the silver nanoparticles mainly cohered to one another.

Further, spike-like electron emission current I2 was measured at around 35 V of the applied voltage. This was caused because electric charge accumulated in the insulating fine particles constituting the fine particle layer caused insulation breakdown at once. In a case where such a waveform occurs, physical breaking occurs in the fine particle layer. As such, it is found that the element having a poor dispersion state of the conductive fine particles in the fine particle layer serving as the electron acceleration layer easily causes insulation breakdown.

Embodiment 2

Figure 10:
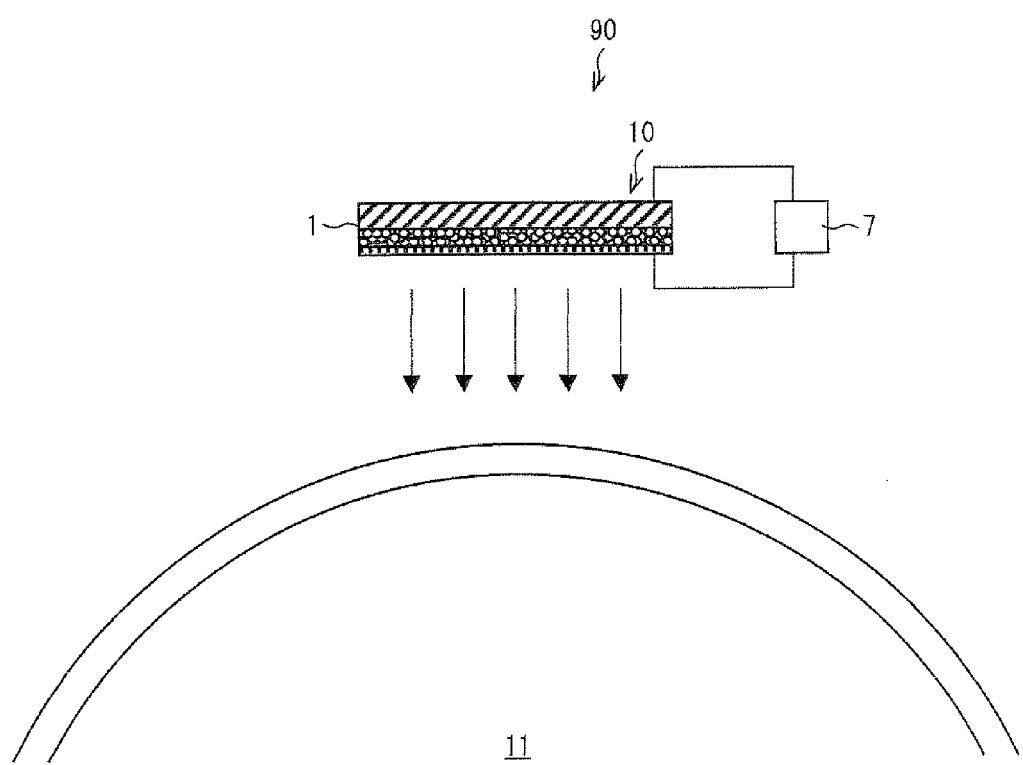
FIG. 10 is a diagram illustrating an example of a charging device including an electron emitting device of FIG. 1.

FIG. 10 illustrates one example of a charging device 90, according to the present invention, including an electron emitting device 10, described in Embodiment 1, employing an electron emitting element 1 according to one embodiment of the present invention.

The charging device 90 includes the electron emitting device 10 including the electron emitting element 1 and a power supply 7 for applying a voltage to the electron emitting element 1. The charging device 90 is used for electrically charging a surface of a photoreceptor drum 11. An image forming apparatus of the present invention includes the charging device 90. In the image forming apparatus of the present invention, the electron emitting element 1 in the charging device 90 is provided so as to face the photoreceptor drum 11 to be charged. Application of a voltage causes the electron emitting element 1 to emit electrons so that the surface of the photoreceptor drum 11 is electrically charged. In the image forming apparatus of the present invention, other than the charging device 90, known members can be used. The electron emitting element 1 serving as the charging device 90 is preferably provided so as to be, for example, 3 mm to 5 mm apart from the surface of the photoreceptor drum 11. Further, it is preferable that a voltage of approximately 25 V is applied to the electron emitting element 1. An electron acceleration layer of the electron emitting element 1 should be configured such that 1 μA/cm$^2$ of electrons are emitted per unit of time in response to application of a voltage of 25V, for example.

Further, the electron emitting device 10 serving as the charging device 90 is configured as a planar electron source. Therefore, the electron emitting device 10 is capable of charging the photoreceptor drum 11 on an area that has a width in a rotation direction. This provides many chances for charging a section of the photoreceptor drum 11. Therefore, the charging device 90 can perform a more uniform electric charging as compared to a wire charging device electrically charging line by line a section on the photoreceptor drum 11. Further, the charging device 90 has an advantage such that the applied voltage is approximately 10 V which is far lower than that of a corona discharge device which requires an applied voltage of a few kV.

Embodiment 3

Figure 11:
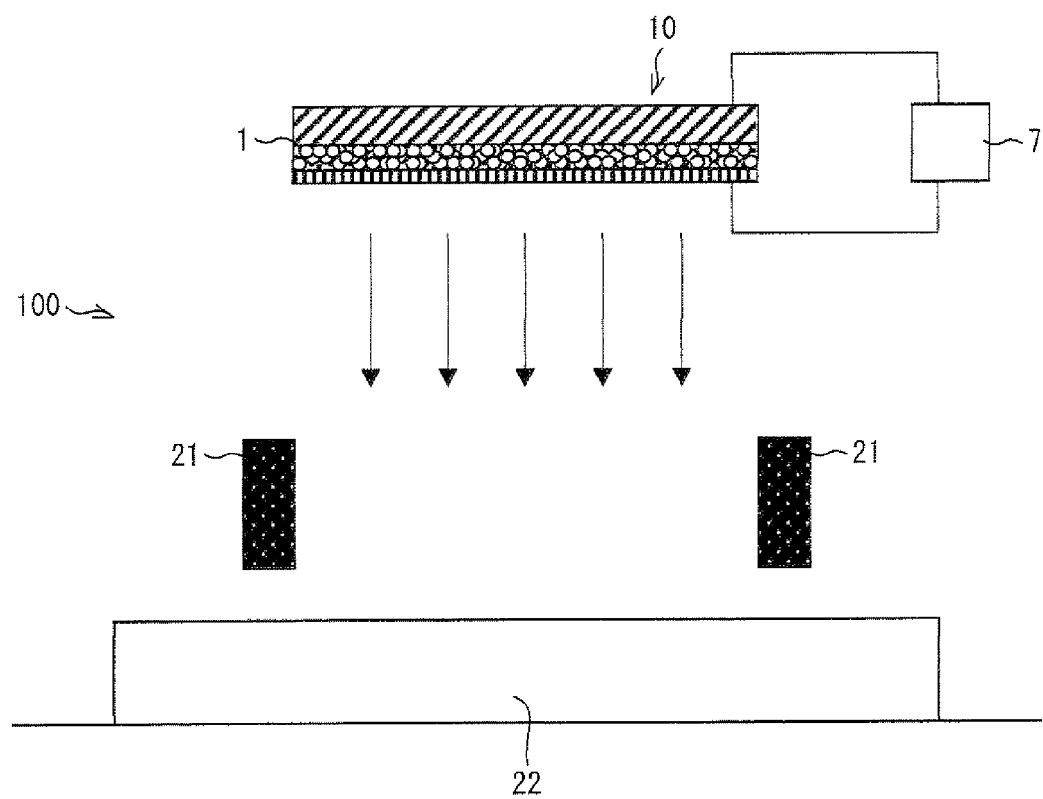
FIG. 11 is a diagram illustrating an example of an electron-beam curing device including an electron emitting device of FIG. 1.

FIG. 11 illustrates an electron-beam curing device 100 of the present invention including an electron emitting device 10, described in Embodiment 1, employing an electron emitting element 1 according to one embodiment of the present invention.

The electron-beam curing device 100 includes the electron emitting device 10 including the electron emitting element 1 and a power supply 7 for applying a voltage to the electron emitting element 1, and an accelerating electrode 21 for accelerating electrons. In the electron-beam curing device 100, the electron emitting element 1 serving as an electron source emits electrons, and the electrons emitted are accelerated by the accelerating electrode 21 so that the electrons collide with a resist (an object to be cured) 22. Energy necessary for curing the general resist 22 is not more than 10 eV. In terms of energy, the accelerating electrode is not necessary. However, a penetration depth of an electron beam is determined by a function of energy of electrons. For example, in order to entirely cure the resist 22 having a thickness of 1 μm, an accelerating voltage of approximately 5 kV is required.

In a conventional general electron-beam curing device, an electron source is sealed in vacuum and caused to emit electrons by application of a high voltage (in a range of 50 kV to 100 kV). The electrons are taken out through an electron window and used for irradiation. According to the above electron emission method, when the electrons pass through the electron window, loss of a large amount of energy occurs in the electrons. Further, the electrons that reach the resist pass through the resist in the thickness direction because the electrons have high energy. This decreases energy utilization efficiency. In addition, because an area on which electrons are thrown at a time is small and irradiation is performed in a manner drawing with dots, throughput is low.

The configuration employing the electron emitting device 10 is free from energy loss because the electrons do not pass through the electron window. This allows reducing an applied voltage. Moreover, since the electron emitting device 10 is a planar electron source, the throughput increases significantly. In a case where electrons are emitted in accordance with a pattern, it is possible to perform a maskless exposure.

Embodiment 4

Figure 12:
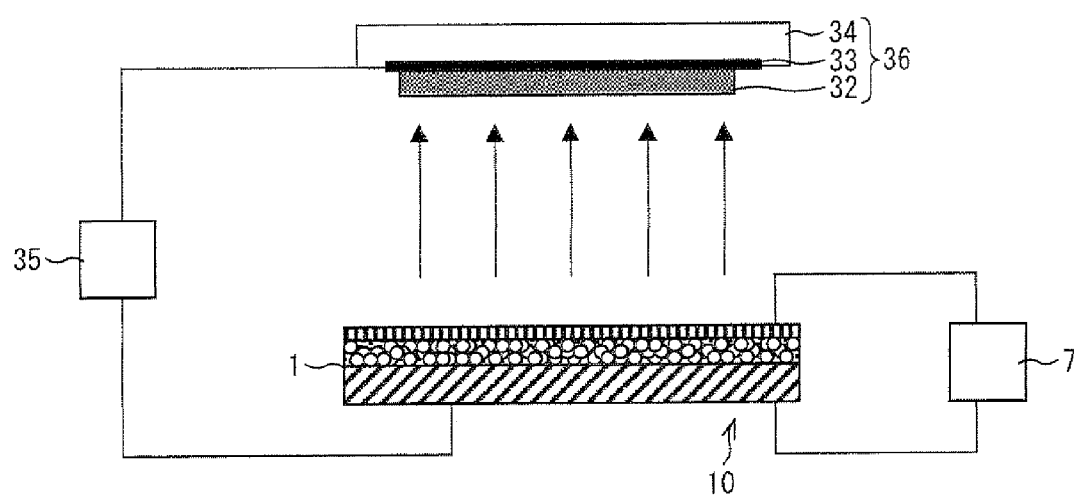
FIG. 12 is a diagram illustrating an example of a light emitting device including an electron emitting device of FIG. 1.
Figure 13:
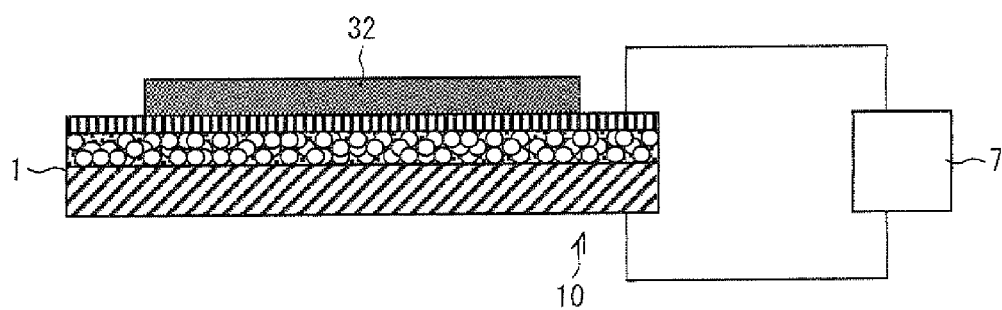
FIG. 13 is a diagram illustrating another example of a light emitting device including an electron emitting device of FIG. 1.
Figure 14:
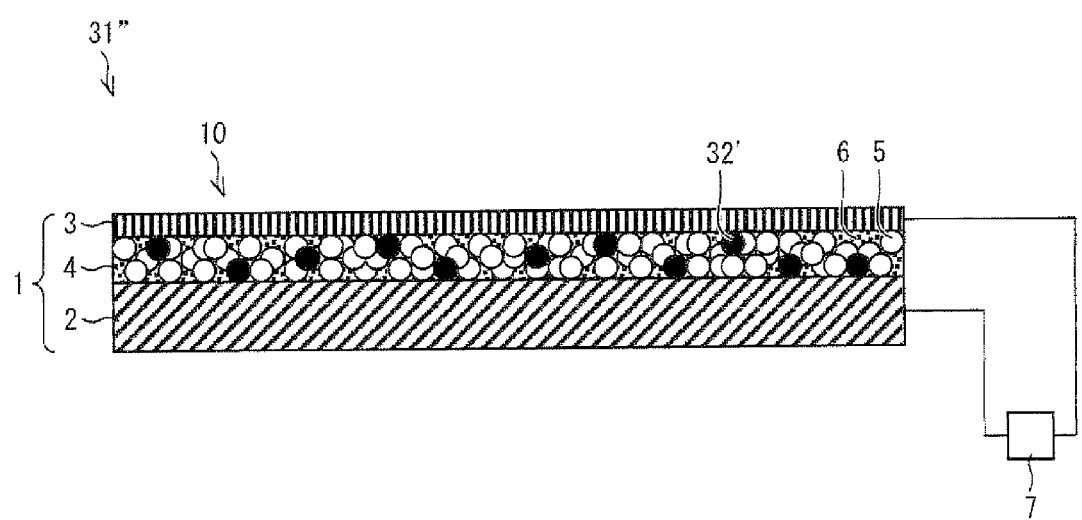
FIG. 14 is a diagram illustrating still another example of a light emitting device including an electron emitting device of FIG. 1.

FIGS. 12 through 14 show examples of respective light emitting devices of the present invention each including an electron emitting device 10, described in Embodiment 1, employing an electron emitting element 1 according to one embodiment of the present invention.

A light emitting device 31 illustrated in FIG. 12 includes the electron emitting device 10 including an electron emitting element 1 and a power supply 7 for applying a voltage to the electron emitting element 1, and a light-emitting section 36. The light-emitting section 36 has a laminated structure including a glass substrate 34 as a base material, an ITO film 33, and a luminous body 32. The light emitting section 36 is provided apart from the electron emitting element 1 so as to face the electron emitting element 1.

Suitable materials of the luminous body 32 are materials that are excited by electrons and that correspond to red light emission, green light emission, and blue light emission, respectively. Examples usable as such materials corresponding to red are $Y_2O_3$:Eu, and (Y, Gd) $Bo_3$:Eu; examples usable as such materials corresponding to green are $Zn_2SiO_4$:Mn and $BaAl_{12}O_{19}$:Mn; and an example usable as such materials corresponding to blue is $BaMgAl_{10}O_{17}$:$Eu^{2+}$. A film of the luminous body 32 is formed on the ITO film 33 which is formed on the glass substrate 34. It is preferable that the luminous body 32 is approximately 1 μm in thickness. Further, the ITO film 33 may have any thickness as long as the ITO film 33 can reliably have electric conductivity at the thickness. In the present embodiment, the ITO film 33 is set to 150 nm in thickness.

For forming a film of the luminous body 32, a mixture of epoxy resin serving as a binder and luminous-body particles is prepared, and a film of the mixture may be formed by a known method such as a bar coater method or a dropping method.

In this embodiment, in order to increase a brightness of light emitted from the luminous body 32, it is necessary to accelerate, toward the luminous body 32, electrons which are emitted from the electron emitting element 1. In order to realize such acceleration, as illustrated in FIG. 12, it is preferable that a power supply 35 be provided between the electrode substrate 2 of the electron emitting element 1 and the ITO film 33 of the light-emitting section 36. This configuration allows application of a voltage for causing an electric field for accelerating the electros. In this case, it is preferable that: (i) a distance between the luminous body 32 and the electron emitting element 1 is 0.3 mm to 1 mm; a voltage applied by the power supply 7 is 18V; and a voltage applied by the power supply 35 is 500 V to 2000 V.

A light emitting device 31' shown in FIG. 13 includes the electron emitting device 10 including an electron emitting element 1 and a power supply 7 for applying a voltage to the electron emitting element 1, and a luminous body (light emitting body) 32. In the light emitting device 31', the luminous body 32 is a planar luminous body which is provided on a surface of the electron emitting element 1. In the present embodiment, a layer of the luminous body 32 is formed on a surface of the electron emitting element 1, in such a manner that a mixture of epoxy resin serving as a binder and luminous-body particles is prepared as described above and a film of the mixture is formed on the surface of the electron emitting element 1. Note that, because the electron emitting element 1 itself has a structure which is vulnerable to external force, the element may be damaged as a result of use of the bar coater method. Therefore, it is preferable to use the dropping method or the spin coating method.

A light emitting device 31" shown in FIG. 14 includes the electron emitting device 10 including an electron emitting element 1 and a power supply 7 for applying a voltage to the electron emitting element 1. Further, in a fine particle layer 4 of the electron emitting element 1, luminous fine particles as a luminous body (light emitting body) 32' are mixed in. In this case, the luminous body 32' may be configured to also serve as the insulating fine particles 5. Generally, however, the luminous-body fine particles have a low electric resistance. As compared to electric resistance of the insulating fine particles 5, the electric resistance of the luminous-body fine particles is clearly lower. Therefore, when the luminous-body fine particles are mixed in replacement of the insulating fine particles 5, an amount of the luminous-body fine particles should be suppressed to a small amount. For example, when spherical silica particles (average particle diameter of 110 nm) are used as the insulating fine particles 5 and ZnS:Mg (average particle diameter of 500 nm) is used as the luminous-body fine particles, an appropriate mixture ratio by weight of the insulating fine particles 5 and the luminous-body fine particles is approximately 3:1.

In the above light emitting devices 31, 31', and 31", electrons emitted from the electron emitting element 1 are caused to collide with the corresponding luminous bodies 32 and 32' so that light is emitted.

The electron emitting element 1 is improved in the amount of the electrons emitted, and therefore, the light emitting devices 31, 31' and 31" can emit light efficiently. If the light emitting devices 31, 31', and 31" are sealed in vacuum, the light emitting devices 31, 31', and 31" can work more efficiently because the electron emission current improves.

Figure 15:
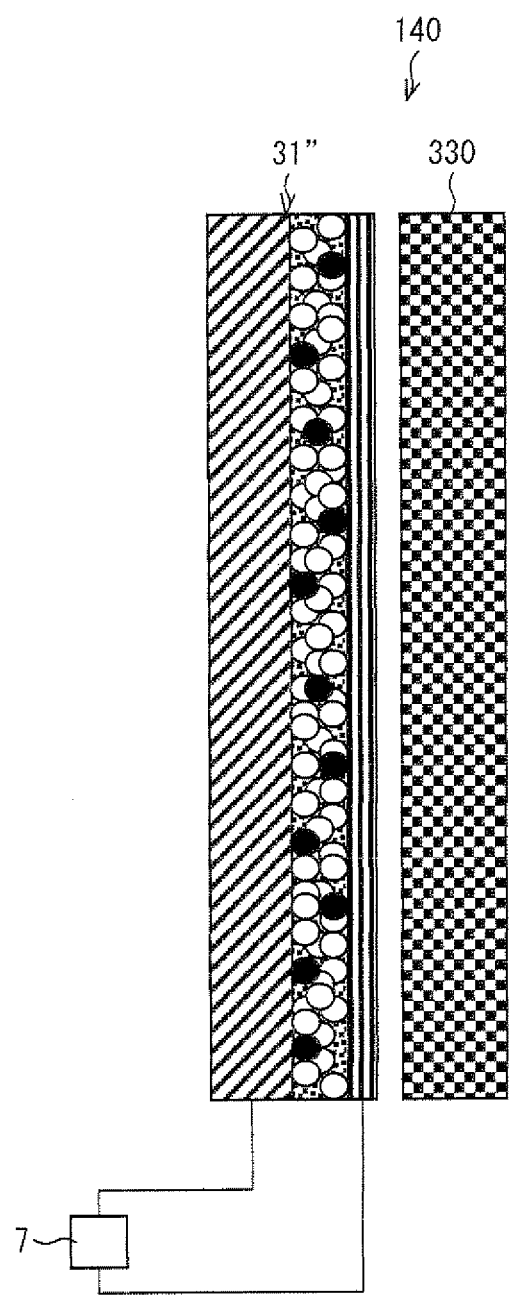
FIG. 15 is a diagram illustrating an example of an image display device which includes a light emitting device including the electron emitting device of FIG. 1.

FIG. 15 illustrates an example of an image display device of the present invention which includes a light emitting device of the present invention. An image display device 140 illustrated in FIG. 15 includes a light emitting device 31" illustrated in FIG. 14, and a liquid crystal panel 330. In the image display device 140, the light emitting device 31" is provided behind the crystal panel 330 and used as a backlight. In cases where the light emitting device 31" is used in the image display device 140, it is preferable that a voltage of 20 V to 35 V is applied to the light emitting device 31". The light emitting device 31" should be configured to emit, for example, 10 μA/cm² of electrons per unit of time at the voltage of 20 V to 35 V. Further, it is preferable that a distance between the light emitting device 31" and the liquid crystal panel 330 is approximately 0.1 mm.

In cases where light emitting devices 31 illustrated in FIG. 12 are used as an image display device of the present invention, the light emitting devices 31 may be arranged in a matrix so as to form a shape that allows the light emitting devices 31 themselves serving as an FED to form and display an image. In such cases, it is preferable that a voltage applied to the light emitting device 31 is in a range of 20 V to 35 V. The light emitting device 31 should be configured to emit, for example, 10 μA/cm² of electrons per unit of time, at the applied voltage in the range of 20 V to 35 V.

Embodiment 5

Figure 16:
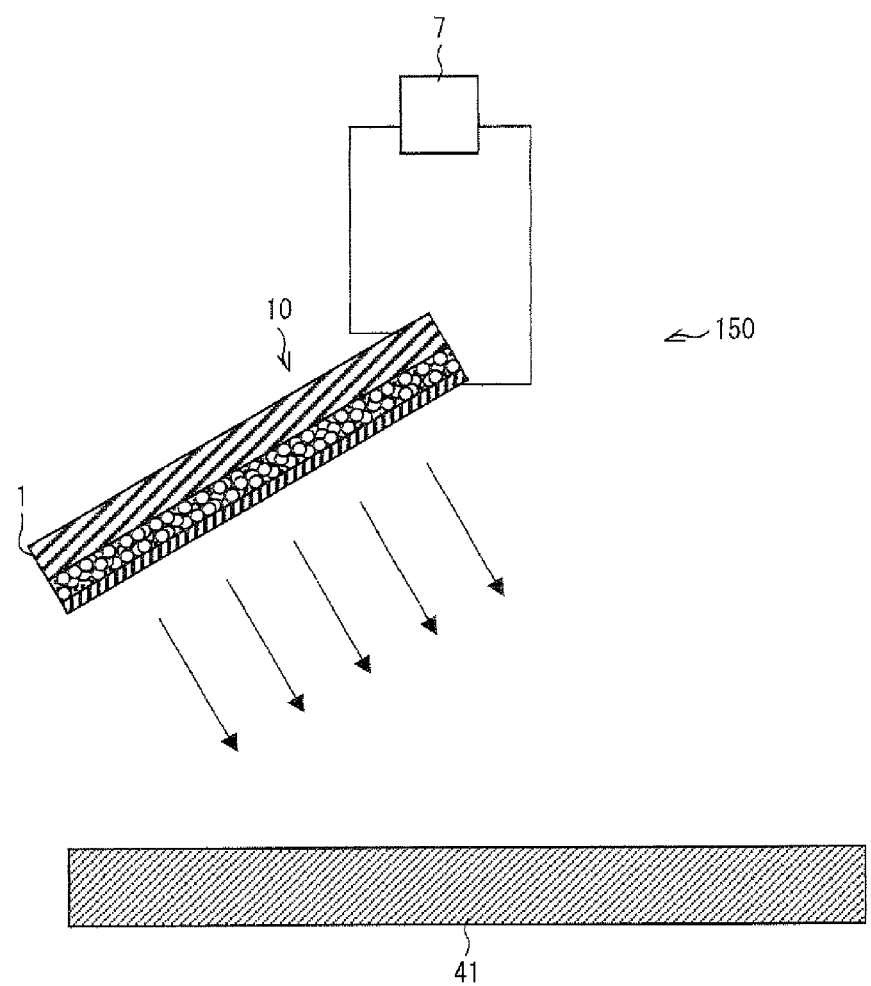
FIG. 16 is a diagram illustrating an example of an air blowing device including an electron emitting device of FIG. 1 and a cooling device which includes the air blowing device.
Figure 17:
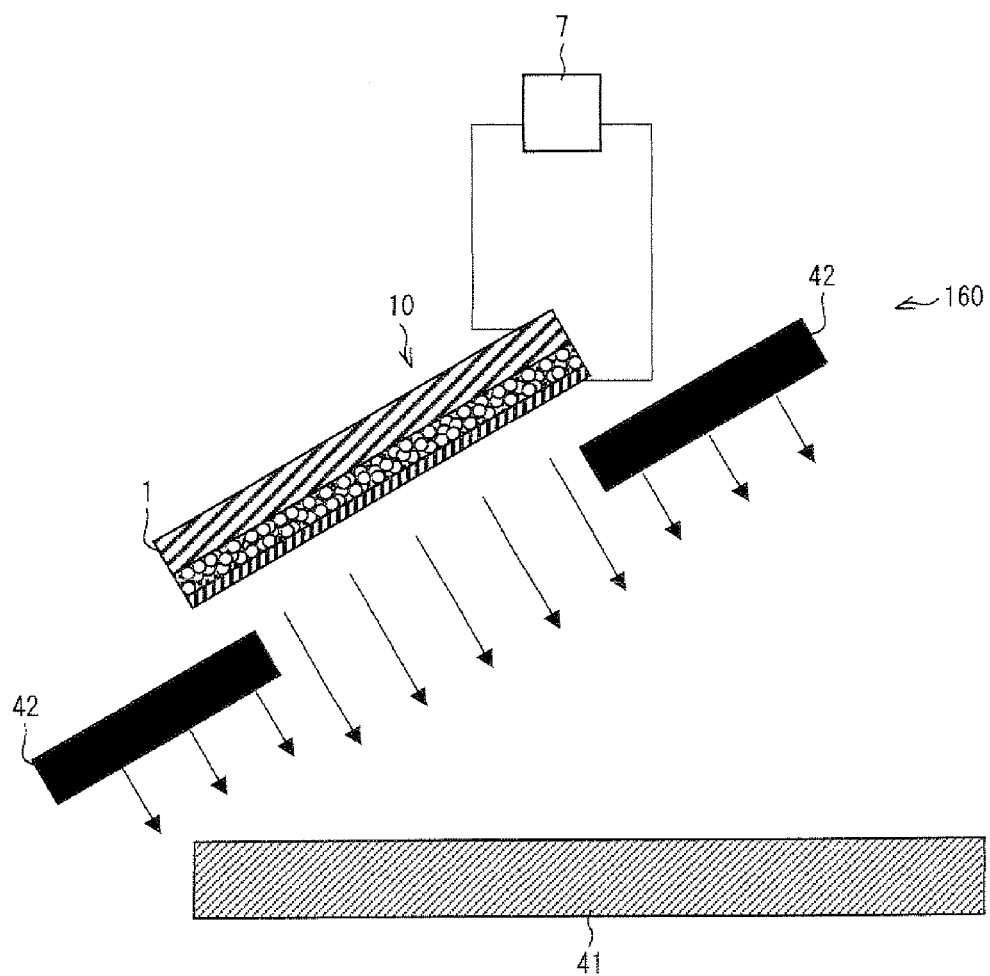
FIG. 17 is a diagram illustrating another example of an air blowing device including an electron emitting device of FIG. 1 and a cooling device which includes the air blowing device.

FIG. 16 and FIG. 17 illustrate examples of air blowing devices of the present invention each including an electron emitting device 10, described in Embodiment 1, employing an electron emitting element 1 according to one embodiment of the present invention. The following explanation deals with a case where each of the air blowing devices of the present invention is used as a cooling device. However, application of the air blowing device is not limited to a cooling device.

An air blowing device 150 illustrated in FIG. 16 includes the electron emitting device 10 including an electron emitting element 1 and a power supply 7 for applying a voltage to the electron emitting element 1. In the air blowing device 150, the electron emitting element 1 emits electrons toward an object 41 to be cooled so that ion wind is generated and the object 41 electrically grounded is cooled. In cases where the object 41 is cooled, it is preferable that a voltage of approximately 18 V is applied to the electron emitting element 1 and, at this applied voltage of approximately 18 V, the electron emitting element 1 emits, for example, 1 μA/cm$^2$ of electrons per unit of time in the atmosphere.

In addition to the arrangement of the air blowing device 150 illustrated in FIG. 16, an air blowing device 160 illustrated in FIG. 17 further includes a blowing fan 42. In the air blowing device 160 illustrated in FIG. 17, an electron emitting element 1 emits electrons toward an object 41 to be cooled and the blowing fan 42 blows the electrons toward the object 41 so that the object 41 electrically grounded is cooled down by generation of ion wind. In this case, it is preferable that an air volume generated by the blowing fan 42 is in a range of 0.9 L to 2 L per minute per square centimeter.

Now, a case where the object 41 is to be cooled by blowing air is considered. In a case where the object 41 is cooled by blowing only the atmospheric air with use of a fan or the like as in a conventional air blowing device or a conventional cooling device, cooling efficiency is low because a flow rate on a surface of the object 41 becomes 0 and the air in a section from which heat should be dissipated the most is not replaced. However, in cases where electrically charged particles such as electrons or ions are included in the air sent as wind (airflow) to the object 41, the air sent to the object 41 is attracted to the surface of the object 41 by electric force in the vicinity of the object 41. This makes it possible to replace the air in the vicinity of the surface of the object 41. In the present embodiment, because the air blowing devices 150 and 160 of the present invention blow air including electrically charged particles such as electrons or ions, the cooling efficiency is significantly improved.

As describe above, an electron emitting element of the present invention includes: an electrode substrate and a thin-film electrode, which are provided so as to face each other; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, the electron acceleration layer including a fine particle layer containing insulating fine particles, the fine particle layer further containing a basic dispersant.

As has been already described, with the configuration, when a voltage is applied between the electrode substrate and the thin-film electrode, current flows in the electron acceleration layer. A part of electrons in the current becomes ballistic electrons due to an intense electric field formed by the applied voltage, and the ballistic electrons are emitted from a side of the thin-film electrode.

Here, it is considered that an electron pair donor that donates a pair of electrons, included in the basic dispersant, causes electrons to be emitted from the electron emitting element. That is, the basic dispersant includes the electron pair donor that donates a pair of electrons, and the electron pair donor is ionized after donating the pair of electrons. It is considered that the ionized electron pair donor transfers electric charge on a surface of the insulating fine particle to which the electron pair donor is attached, thereby allowing electric conduction on the surface of the insulating fine particle.

Further, the electron acceleration layer is configured such that fine particles of metal or the like is not necessary to be dispersed in the electron acceleration layer. As a result, the electron emitting element of the present invention does not have such a problem that the fine particles of metal or the like cohere to one another and the cohesion causes insulation breakdown in the electron acceleration layer. Consequently, it is possible to configure the electron acceleration layer in which insulation breakdown hardly occurs, without using a plasma CVD device or a thermal CVD device.

In addition, since the dispersant, which is an essential component for dispersing insulating fine particles in a solvent, also works as the fine particles of metal or the like, it is possible to reduce production processes and cost for materials.

As a result, it is advantageously possible to provide an electron emitting element in which insulation breakdown hardly occurs in an insulating layer and which can be produced at a low cost.

In addition to the configuration, in the electron emitting element of the present invention, the basic dispersant may include a polymeric material that disperses the insulating fine particles due to its steric repulsion effect, into which polymeric material an electron pair donor that donates a pair of electrons is introduced as a substituent.

Since the basic dispersant includes a polymeric material that disperses the insulating fine particles due to its steric repulsion effect, it is possible to successfully disperse the insulating fine particles, thereby allowing forming a uniform fine particle layer as the electron acceleration layer. As a result, it is possible to restrain production tolerance of the electron emitting element.

Further, there is an optimal value in an additive amount of the basic dispersant. In a case where the additive amount is excessive, a resistive component of the polymeric material included in the basic dispersant may cause current in the element to be difficult to flow, thereby resulting in that electron emission from the electron emitting element may be decreased. On the other hand, in a case where the additive amount is far below its lower limit, it is difficult to obtain a sufficient amount of current flowing in the electron acceleration layer, thereby resulting in that no electron emission can be obtained at all from the electron emitting element. The additive amount of the basic dispersant is optimally designed in association with the insulating fine particles. By adequately controlling the additive amount, it is possible to obtain sufficient electron emission from the electron emitting element.

In addition to the above configuration, in the electron emitting element of the present invention, it is preferable that the insulating fine particles have an average particle diameter of 10 nm to 1000 nm, more preferably 10 nm to 200 nm. In such a case, diameters of the fine particles may be broadly distributed with respect to the average particle diameter. For example, fine particles having an average particle diameter of 50 nm may have particle diameter distribution in a range of 20 nm to 100 nm. In a case where the particle diameter of the insulating fine particles is too small, the particles easily cohere to one another because strong force works between the particles, thereby resulting in that dispersion of the particles becomes difficult. Further, in a case where the particle diameter of the insulating fine particles is too large, although the insulating fine particles are dispersed very well, it is difficult to adjust a thickness of the electron acceleration layer or a content ratio of a surface conducive material in order to adjust resistance.

In addition to the above configuration, in the electron emitting element of the present invention, it is preferable that the electron acceleration layer have a layer thickness of 12 nm to 6000 nm, more preferably 300 nm to 2000 nm. When the electron acceleration layer has a layer thickness in the above range, it is possible to uniformly form the electron acceleration layer and to adjust resistance of the electron acceleration layer in a layer thickness direction thereof. The configuration allows the electron emitting element to emit electrons from a whole surface of the electron emitting element to the outside of the element with high efficiency.

In addition to the above configuration, in the electron emitting element of the present invention, the insulating fine particles may contain an organic polymer or at least one of $SiO_2$, $Al_2O_3$, and $TiO_2$. By arranging the insulating fine particles to contain an organic polymer or at least one of $SiO_2$, $Al_2O_3$, and $TiO_2$, it becomes possible to adjust a resistance value in any range due to a high insulating property of the above substances. In particular, in a case where oxide (of $SiO_2$, $Al_2O_3$, and $TiO_2$) is used as the insulating fine particles and conductive fine particles having a high resistance to oxidation is used as the surface conductive material, element degradation due to oxidation caused by oxygen in the atmosphere is made more difficult to occur. Therefore, the effect of steadily operating the electron emitting element under the atmospheric pressure can be obtained more significantly.

In addition to the above configuration, in the electron emitting element of the present invention, the thin-film electrode may contain at least one of gold, silver, carbon, tungsten, titanium, aluminum, and palladium. Since the thin-film electrode contains at least one of gold, silver, carbon, tungsten, titanium, aluminum, and palladium, tunneling of electrons generated by the electron acceleration layer becomes more efficient due to a low work function of the above substances. As a result, it is possible to emit more electrons having high energy to the outside of the electron emitting element.

An electron emitting device of the present invention includes: any one of the aforementioned electron emitting elements; and a power supply section for applying a voltage between an electrode substrate and a thin-film electrode provided in the any one of the aforementioned electron emitting elements.

As has been already described in terms of the electron emitting element, the electron emitting element of the present invention is an electron emitting element which does not cause insulation breakdown in an insulating layer and which can be produced by use of an inexpensive device. Therefore, the electron emitting device employing the electron emitting element is also an electron emitting device which does not cause insulation breakdown in an insulating layer and which can be produced by use of an inexpensive device.

Further, a light emitting device, an image display device, an air blowing device, a cooling device, a charging device, an image forming apparatus, and an electron-beam curing device, each employing the electron emitting device of the present invention, are included in the scope of the present invention.

A method of the present invention for producing an electron emitting element is a method for producing an electron emitting element that includes: an electrode substrate and a thin-film electrode, which are provided so as to face each other; and an electron acceleration layer sandwiched between the electrode substrate and the thin-film electrode, the electron emitting element (i) accelerating electrons in the electron acceleration layer at a time when a voltage is applied between the electrode substrate and the thin-film electrode and (ii) emitting the electrons from the thin-film electrode, and the method of the present invention includes the steps of: (a) forming a fine particle layer serving as the electron acceleration layer on the electrode substrate with the use of an insulating fine particle dispersion solution in which insulating fine particles are dispersed in a solvent by use of a basic dispersant; and (b) forming the thin-film electrode on the fine particle layer.

With the configuration, it is possible to provide an electron emitting element of the present invention which does not cause insulation breakdown in an insulating layer and which can be produced at a low cost.

In the method of the present invention for producing an electron emitting element, it is preferable that the basic dispersant include a polymeric material that disperses the insulating fine particles due to its steric repulsion effect, into which polymeric material an electron pair donor that donates a pair of electrons is introduced as a substituent.

As described above, since the basic dispersant includes a polymeric material that disperses the insulating fine particles due to its steric repulsion effect, it is possible to successfully disperse the insulating fine particles, thereby allowing forming a uniform fine particle layer as the electron acceleration layer. As a result, it is possible to restrain production tolerance of the electron emitting element.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The electron emitting element of the present invention can assure electric conduction and flow sufficient current in the element, thereby causing ballistic electrons to be emitted from the thin-film electrode. As a result, the electron emitting element of the present invention can be suitably applied, for example, (i) to a charging device of image forming apparatuses such as an electrophotographic copying machine, a printer, and a facsimile; (ii) an electron-beam curing device; (iii) in combination with a luminous body, to an image display device; or (iv) by utilizing ion wind generated by electrons emitted from the electron emitting element, to a cooling device.

REFERENCE SIGNS LIST

1 Electron Emitting Element
2 Electrode Substrate
3 Thin-Film Electrode
4 Electron Acceleration Layer
5 Insulating Fine Particles
6 Basic Dispersant
7 Power Supply (Power supply section)
7A Power Supply (Power supply section)
7B Power Supply (Power supply section)
8 Counter Electrode
9 Insulating Spacer
10 Electron Emitting Device
11 Photoreceptor Drum
15 Region where Steric Hindrance is caused
21 Acceleration Electrode
22 Resist (Object to be cured)
31, 31', 31" Light Emitting Device
32, 32' Luminous Body (Light emitting body)
33 ITO Film
34 Glass Substrate
35 Power Supply 36 Light Emitting Section
41 Object to be cooled
42 Air Blowing Fan
90 Charging Device
100 Electron-beam Curing Device
140 Image Display Device
150 Air Blowing Device
160 Air Blowing Device
330 Liquid Crystal Panel

The invention claimed is:

1. An electron emitting element comprising:
an electrode substrate and a thin-film electrode, which are provided so as to face each other; and
an electron acceleration layer sandwiched between the electrode substrate and the thin-film electrode,
the electron emitting element (i) accelerating electrons in the electron acceleration layer at a time when a voltage is applied between the electrode substrate and the thin-film electrode and (ii) emitting the electrons from the thin-film electrode,
the electron acceleration layer including a fine particle layer containing insulating fine particles,
the fine particle layer further containing a basic dispersant, wherein:
the basic dispersant includes a polymeric material that disperses the insulating fine particles due to its steric repulsion effect, into which polymeric material an electron pair donor that donates a pair of electrons is introduced as a substituent.

2. The electron emitting element as set forth in claim 1, wherein:
the insulating fine particles have an average particle diameter of 10 nm to 1000 nm.

3. The electron emitting element as set forth in claim 2, wherein:
the insulating fine particles have an average particle diameter of 10 nm to 200 nm.

4. The electron emitting element as set forth in claim 1, wherein:
the electron acceleration layer has a layer thickness of 12 nm to 6000 nm.

5. The electron emitting element as set forth in claim 4, wherein:
the electron acceleration layer has a layer thickness of 300 nm to 2000 nm.

6. The electron acceleration layer as set forth in claim 1, wherein:
the insulating fine particles contains an organic polymer or at least one of $SiO_2$, $Al_2O_3$, and $TiO_2$.

7. The electron emitting element as set forth in claim 1, wherein:
the thin-film electrode contains at least one of gold, silver, carbon, tungsten, titanium, aluminum, and palladium.

8. An electron emitting device comprising:
an electron emitting element as set forth in claim 1; and
a power supply section for applying a voltage between an electrode substrate and a thin-film electrode each provided in the electron emitting element.

9. A light emitting device comprising:
an electron emitting device as set forth in claim 8; and
a light emitting body,
the light emitting device causing the light emitting body to emit light by causing the electron emitting device to emit electrons.

10. An air blowing device comprising:
an electron emitting device as set forth in claim 8,
the air blowing device causing the electron emitting device to emit electrons and blowing the electrons.

11. A charging device comprising:
an electron emitting device as set forth in claim 8,
the charging device charging a photoreceptor by causing the electron emitting device to emit electrons.

12. An electron-beam curing device comprising an electron emitting device as set forth in claim 8.

13. A method for producing an electron emitting element that includes:
an electrode substrate and a thin-film electrode, which are provided so as to face each other; and
an electron acceleration layer provided between the electrode substrate and the thin-film electrode,
the electron emitting element (i) accelerating electrons in the electron acceleration layer at a time when a voltage is applied between the electrode substrate and the thin-film electrode and (ii) emitting the electrons from the thin-film electrode,
said method comprising the steps of:
(a) forming a fine particle layer serving as the electron acceleration layer on the electrode substrate with the use of an insulating fine particle dispersion solution in which insulating fine particles are dispersed in a solvent by use of a basic dispersant; and
(b) forming the thin-film electrode on the fine particle layer, wherein:
the basic dispersant includes a polymeric material that disperses the insulating fine particles due to its steric repulsion effect, into which polymeric material an electron pair donor that donates a pair of electrons is introduced as a substituent.

* * * * *